US012562850B2

(12) United States Patent　　　(10) Patent No.:　US 12,562,850 B2
Liu et al.　　　　　　　　　　　　　(45) Date of Patent:　　Feb. 24, 2026

(54) NETWORK CODING FOR DUAL CONNECTIVITY

(71) Applicant: QUALCOMM Incorporated, San Diego, CA (US)

(72) Inventors: Kangqi Liu, San Diego, CA (US); Ruiming Zheng, Beijing (CN); Changlong Xu, Beijing (CN); Liangming Wu, Beijing (CN); Kexin Xiao, Shanghai (CN); Jian Li, Shanghai (CN); Hao Xu, Beijing (CN); Wei Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/256,042

(22) PCT Filed: Feb. 10, 2021

(86) PCT No.: PCT/CN2021/076537
§ 371 (c)(1),
(2) Date: Jun. 5, 2023

(87) PCT Pub. No.: WO2022/170568
PCT Pub. Date: Aug. 18, 2022

(65) Prior Publication Data
US 2024/0048287 A1　　Feb. 8, 2024

(51) Int. Cl.
*H04L 1/1829*　　　　(2023.01)
(52) U.S. Cl.
CPC .......... *H04L 1/1832* (2013.01); *H04L 1/1848* (2013.01)
(58) Field of Classification Search
CPC ... H04L 1/1832; H04L 1/1848; H04L 1/0041; H04L 1/0045; H04L 1/0076; H04L 1/08; H04W 80/02
See application file for complete search history.

(56) References Cited

U.S. PATENT DOCUMENTS

2014/0269767 A1* 9/2014 Djukic ................. H04L 1/1825
　　　　　　　　　　　　　　　　　　　　370/474
2015/0215133 A1 7/2015 Cao et al.
(Continued)

FOREIGN PATENT DOCUMENTS

CN　　　108667559 A　　10/2018
WO　　2012018339 A1　　2/2012

OTHER PUBLICATIONS

International Search Report and Written Opinion—PCT/CN2021/076537—ISA/CN—Nov. 9, 2021.

*Primary Examiner* — Yaotang Wang
(74) *Attorney, Agent, or Firm* — QUALCOMM Incorporated

(57) ABSTRACT

Apparatus, methods, and computer-readable media for network coding for dual connectivity are disclosed herein. A base station (BS) sends encoded symbols from a first network coding layer to a first radio link control (RLC) layer and transmits, to a user equipment (UE), encoded data comprising the encoded symbols. The BS also transmits encoded data to a road side unit (RSU) for passing to the UE as a split transmission. The UE can receive encoded packets from the BS and RSU at a network coding layer via a second RLC layer. The UE recovers source packets from the encoded packets with a rateless network code at the network coding layer. The UE sequences the source packets into an ordered set of source packets at the network coding layer and sends the ordered set of source packets from the network coding layer to a packet data convergence protocol layer for processing.

22 Claims, 19 Drawing Sheets

(56) References Cited

U.S. PATENT DOCUMENTS

2019/0357196 A1*  11/2019  Majmundar  ........ H04L 49/3072
2020/0029334 A1*   1/2020  Wang  ................ H04W 72/0466

* cited by examiner

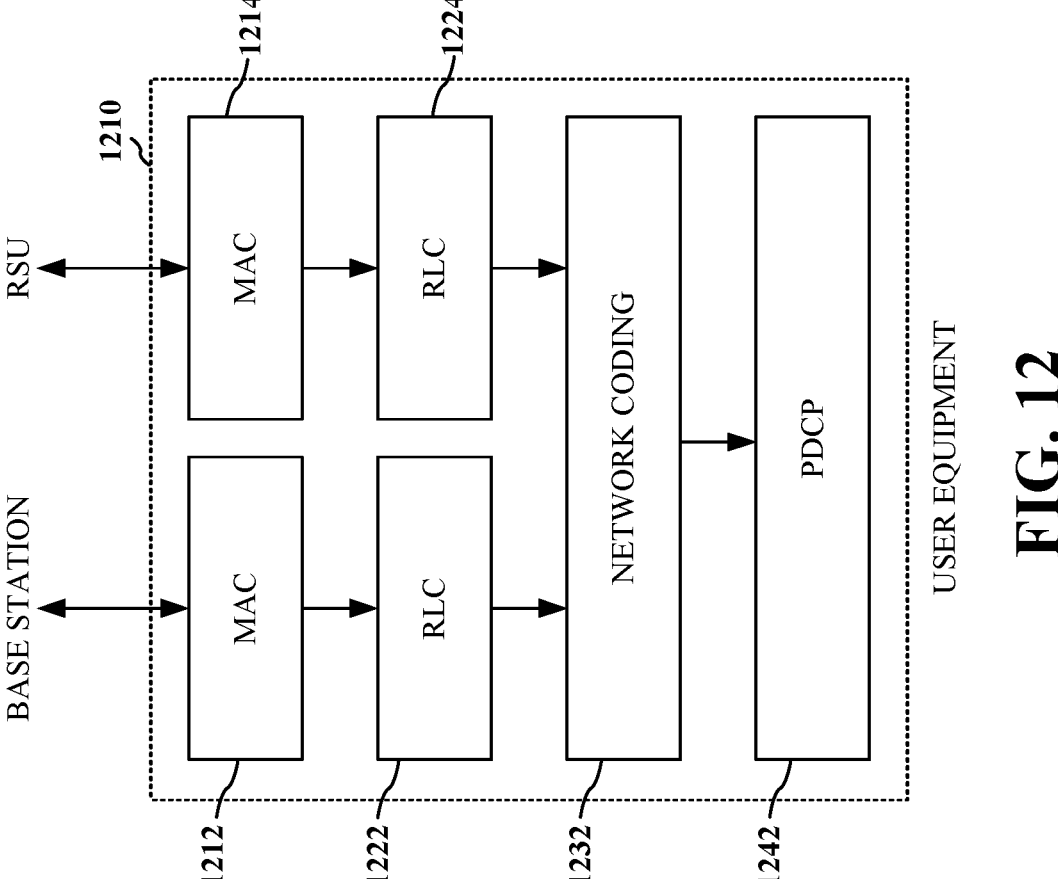
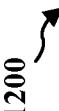
FIG. 12

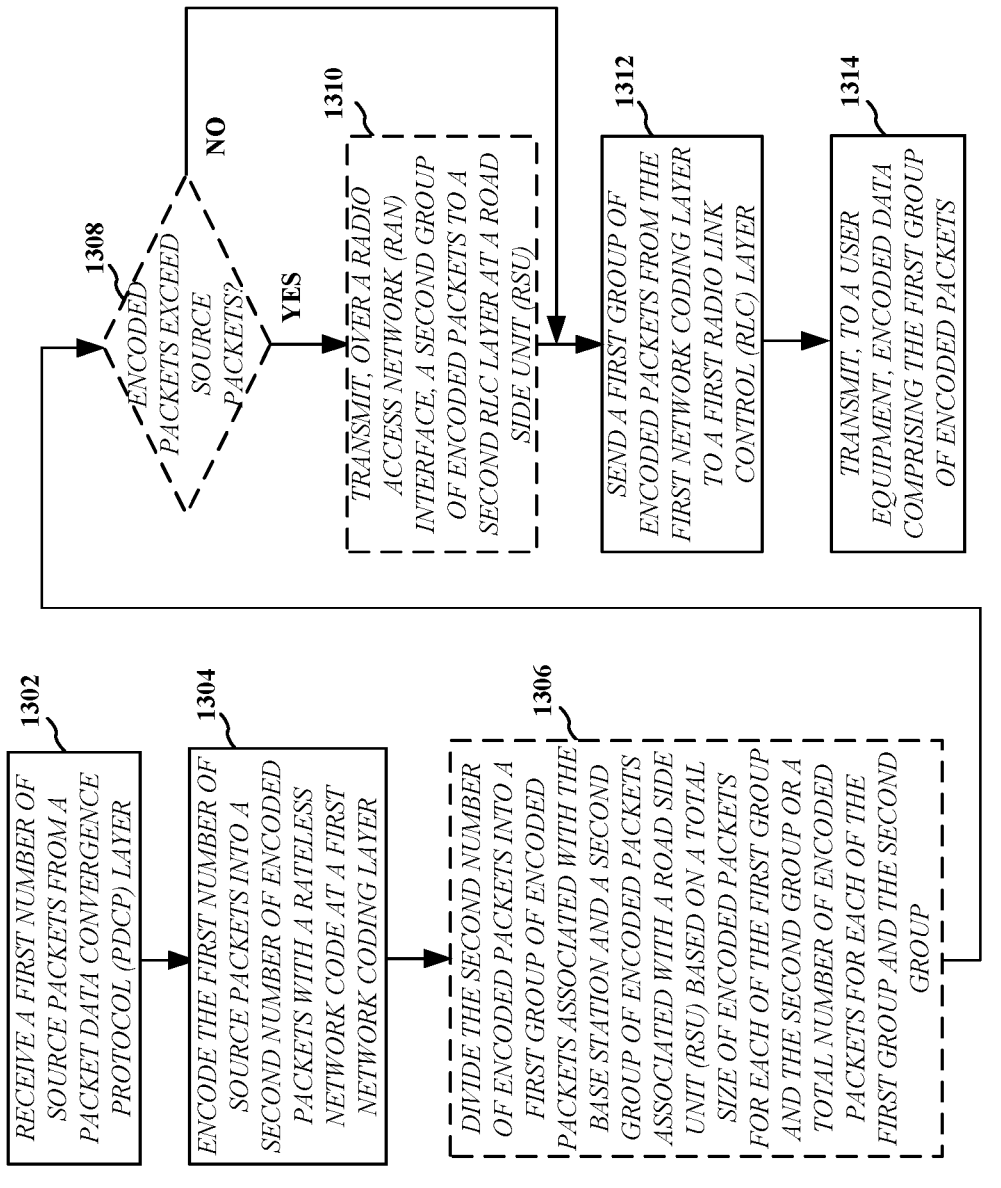
FIG. 13

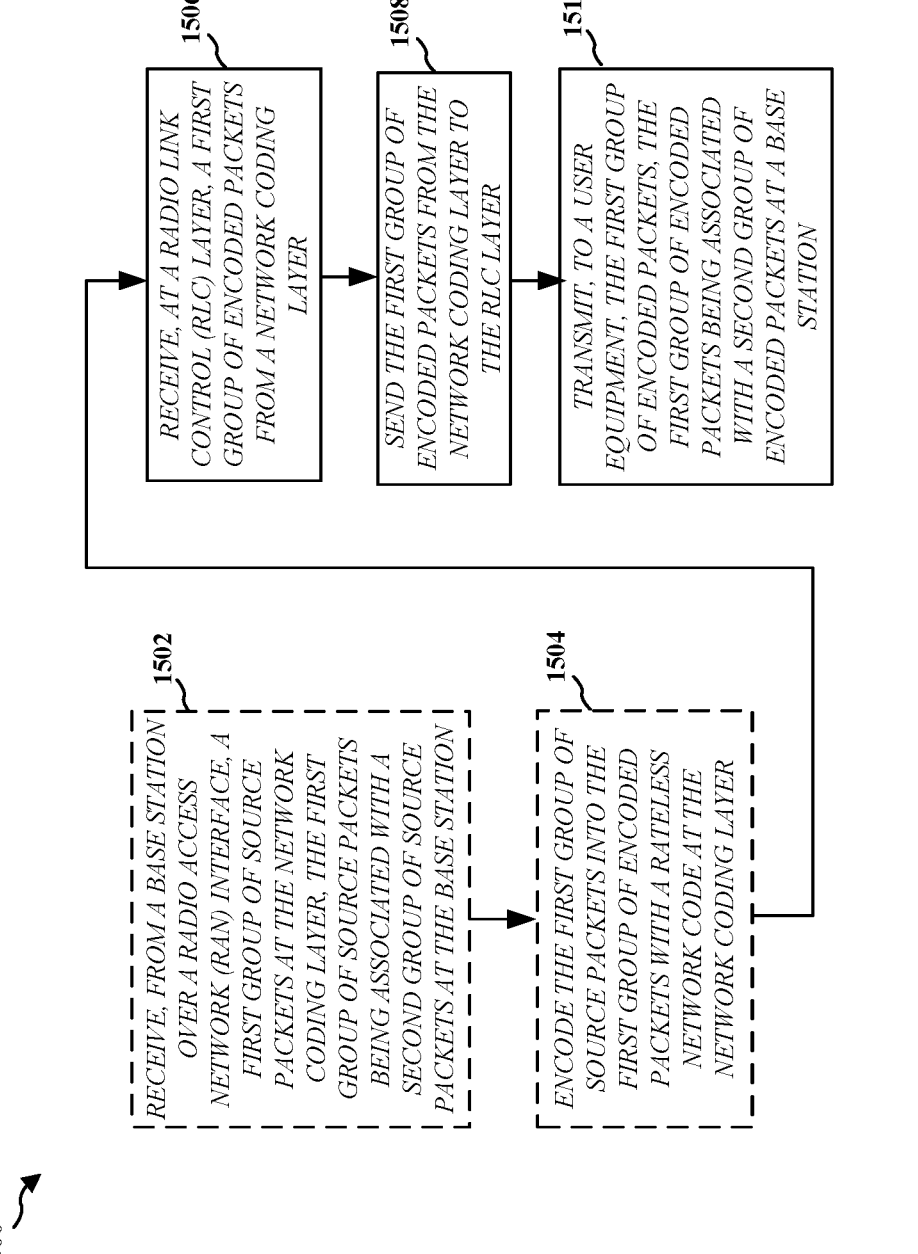

1500

1502

RECEIVE, FROM A BASE STATION OVER A RADIO ACCESS NETWORK (RAN) INTERFACE, A FIRST GROUP OF SOURCE PACKETS AT THE NETWORK CODING LAYER, THE FIRST GROUP OF SOURCE PACKETS BEING ASSOCIATED WITH A SECOND GROUP OF SOURCE PACKETS AT THE BASE STATION

1504

ENCODE THE FIRST GROUP OF SOURCE PACKETS INTO THE FIRST GROUP OF ENCODED PACKETS WITH A RATELESS NETWORK CODE AT THE NETWORK CODING LAYER

1506

RECEIVE, AT A RADIO LINK CONTROL (RLC) LAYER, A FIRST GROUP OF ENCODED PACKETS FROM A NETWORK CODING LAYER

1508

SEND THE FIRST GROUP OF ENCODED PACKETS FROM THE NETWORK CODING LAYER TO THE RLC LAYER

1510

TRANSMIT, TO A USER EQUIPMENT, THE FIRST GROUP OF ENCODED PACKETS, THE FIRST GROUP OF ENCODED PACKETS BEING ASSOCIATED WITH A SECOND GROUP OF ENCODED PACKETS AT A BASE STATION

FIG. 15

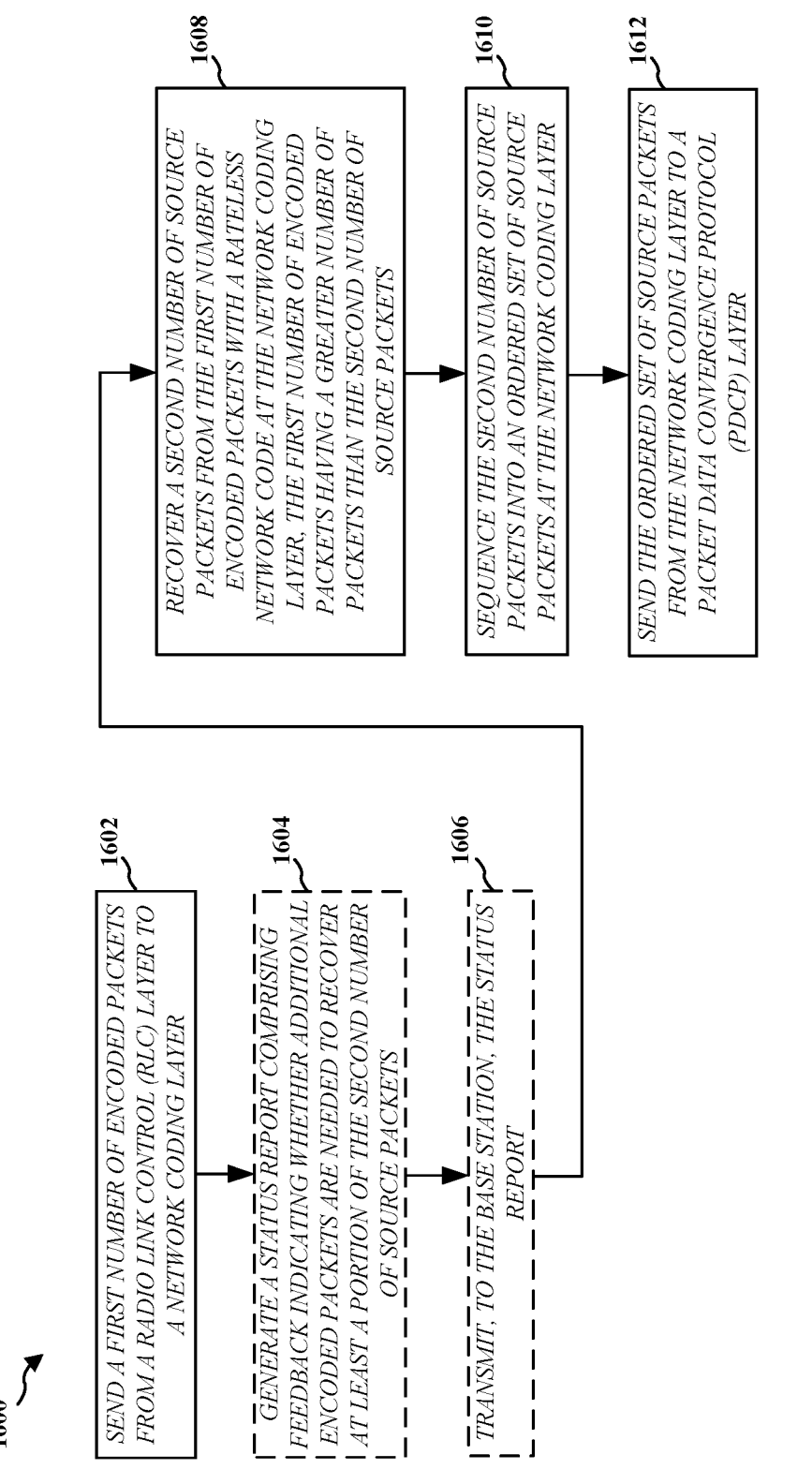

1600

1602 — SEND A FIRST NUMBER OF ENCODED PACKETS FROM A RADIO LINK CONTROL (RLC) LAYER TO A NETWORK CODING LAYER

1604 — GENERATE A STATUS REPORT COMPRISING FEEDBACK INDICATING WHETHER ADDITIONAL ENCODED PACKETS ARE NEEDED TO RECOVER AT LEAST A PORTION OF THE SECOND NUMBER OF SOURCE PACKETS

1606 — TRANSMIT, TO THE BASE STATION, THE STATUS REPORT

1608 — RECOVER A SECOND NUMBER OF SOURCE PACKETS FROM THE FIRST NUMBER OF ENCODED PACKETS WITH A RATELESS NETWORK CODE AT THE NETWORK CODING LAYER, THE FIRST NUMBER OF ENCODED PACKETS HAVING A GREATER NUMBER OF PACKETS THAN THE SECOND NUMBER OF SOURCE PACKETS

1610 — SEQUENCE THE SECOND NUMBER OF SOURCE PACKETS INTO AN ORDERED SET OF SOURCE PACKETS AT THE NETWORK CODING LAYER

1612 — SEND THE ORDERED SET OF SOURCE PACKETS FROM THE NETWORK CODING LAYER TO A PACKET DATA CONVERGENCE PROTOCOL (PDCP) LAYER

FIG. 16

NETWORK CODING FOR DUAL CONNECTIVITY

CROSS REFERENCE TO RELATED APPLICATION(S)

This application is a National Phase entry of PCT Application No. PCT/CN2021/076537, entitled "IMPROVE-MENT IN NETWORK CODING FOR DUAL CONNEC-TIVITY" and filed on Feb. 10, 2021, which is expressly incorporated by reference herein in its entirety.

BACKGROUND

Technical Field

The present disclosure relates generally to wireless communication systems, and more particularly, to improvement in network coding for dual connectivity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in sidelink communication technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various technologies have been introduced to generally improve wireless communications. For example, dual connectivity may increase data rate per user equipment (UE) by allowing data from one radio bearer be separately transmitted between multiple network entities (e.g., base station and/or road side unit (RSU)) to the same UE. In dual connectivity, the base station maintains a U-plane connection with the core network and maintains a C-plane connection toward the mobility management entity (MME). While dual connectivity may improve some aspects of communication between wireless communication devices, such as by increasing throughput speed and/or amount, some issues may arise when dual connectivity is configured in practice. In some scenarios, dual connectivity may be relatively inefficient when sending protocol data units (PDUs), such as PDU of a packet data convergence protocol (PDCP) layer. For example, out-of-order PDU delivery to the receiving device from the transmitting device when splitting transmission of PDCP PDUs for dual connectivity may increase latency. In some cases, the latency may be very high if the packets arranged at and/or near the beginning of a transmission sequence are received later than expected. Such a latency increase may be detrimental to ultra-reliable low-latency communications (URLLC), multimedia broadcast multicast service (MBMS), integrated access and backhaul (IAB) and/or other low-latency services or use cases. Thus, a need exists to improve communication of PDUs using dual connectivity.

This split transmission of PDUs may be wasteful because there is a significant cost of distributed radio resource management (RRM). The consumption (and potential waste) of resources due to PDU split transmission may be increased when channel conditions (e.g., physical channel conditions) between a transmitting device and a receiving device are relatively poor (e.g., requiring additional retransmissions under dynamic link states). Flow control of U-plane data between the base station and the RSU may need to be monitored to avoid any underflow or overflow of data in the RSU.

The present disclosure describes various techniques and solutions for improving communication of PDUs, such as PDUs communicated using dual connectivity. For example, the present disclosure provides for adding a network coding layer in the protocol stack for encoding a dataset through different paths using network coding in order to mitigate one or more of the aforementioned issues potentially arising due to dual connectivity, such as by reducing wastefulness and/or decreasing latency due to out-of-order PDU delivery. In some aspects of the present disclosure, encoding a dataset from at least one SDU using network coding may obviate the need for in-order PDU delivery because network coding may not rely on in-order reception of PDUs. In this regard, there may be no requirement on the ordering of the received encoded packets from different paths at a radio link control (RLC) layer of the receiving device if the receiving device includes an additional network coding layer. In addition, the latency associated with split transmissions may be reduced because the number of encoded packets through different paths can be dynamically adjusted, thus providing better link coverage with more encoded packets at the receiving device.

Further, wastefulness may be reduced because all the received PDUs may be used for decoding by the receiving device, regardless of the transmission path on which a PDU is received.

In an aspect of the disclosure, a method, a computer-readable medium, and an apparatus are provided. In some aspects, the apparatus is a base station. The apparatus can receive a first number of source packets from a packet data convergence protocol (PDCP) layer. The apparatus can encode the first number of source packets into a second number of encoded packets with a rateless network code at a first network coding layer. The apparatus can send the second number of encoded packets from the first network coding layer to a first RLC layer. The apparatus also can transmit, to a user equipment, encoded data comprising the second number of encoded packets.

In another aspect of the disclosure, a method, a computer-readable medium, and an apparatus are provided. In some aspects, the apparatus is a base station. The apparatus can receive a first number of source packets at a PDCP layer. The apparatus can send the first number of source packets from the PDCP layer to a first network coding layer of the base station. The apparatus can encode the first number of source packets into a second number of encoded packets with a rateless network code at the first network coding layer.

In another aspect of the disclosure, a method, a computer-readable medium, and an apparatus are provided. In some aspects, the apparatus is a road side unit. The apparatus can receive, at a RLC layer, a first group of encoded packets from a network coding layer. The apparatus can transmit, to a user equipment, the first group of encoded packets, the first group of encoded packets being associated with a second group of encoded packets at a base station.

In another aspect of the disclosure, a method, a computer-readable medium, and an apparatus are provided. In some aspects, the apparatus is a user equipment. The apparatus can send a first number of encoded packets from a RLC layer to a network coding layer. The apparatus can recover a second number of source packets from the first number of encoded packets with a rateless network code at the network coding layer, in which the first number of encoded packets having a greater number of packets than the second number of source packets. The apparatus can sequence the second number of source packets into an ordered set of source packets at the network coding layer. The apparatus can send the ordered set of source packets from the network coding layer to a PDCP layer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a diagram illustrating a network coding system at a user equipment for dual connectivity, in accordance with one or more of aspects of the present disclosure.

FIG. 13 is a flowchart of a process of wireless communication at a base station, in accordance with one or more of aspects of the present disclosure.

FIG. 15 is a flowchart of a process of wireless communication at a road side unit, in accordance with one or more of aspects of the present disclosure.

FIG. 16 is a flowchart of a process of wireless communication at a user equipment, in accordance with one or more of aspects of the present disclosure.

DETAILED DESCRIPTION

Figure 1:
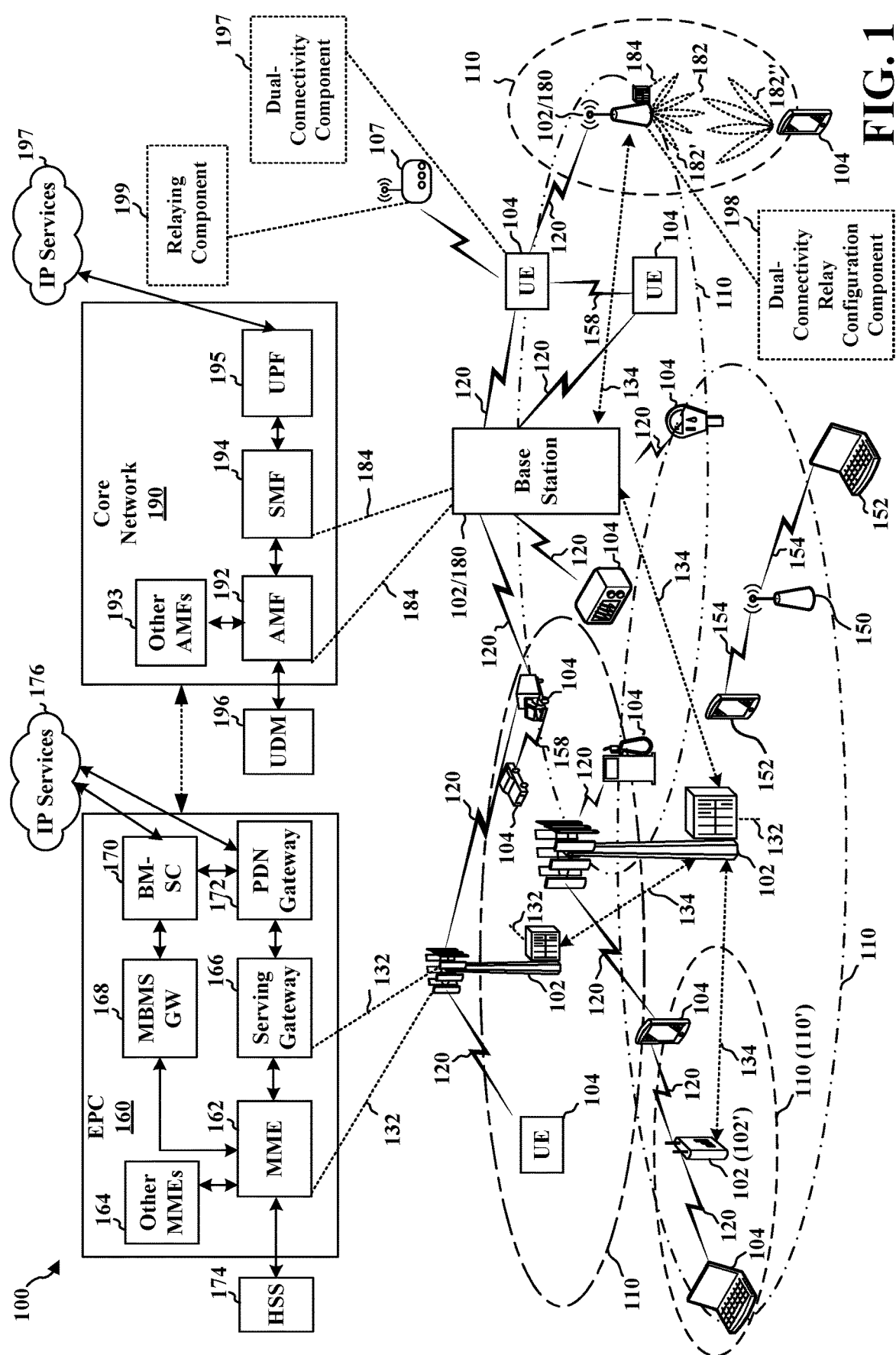
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROX (EE-PROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

In sidelink communication, control information may be indicated by a transmitting UE in multiple SCI parts. The SCI may indicate resources that the UE intends to use, for example, for a sidelink transmission. The UE may transmit a first part of control information indicating information about resource reservation in a physical sidelink control channel (PSCCH) region, and may transmit a second part of the control information in a PSSCH region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, control information may be indicated through a combination of the first SCI part included in the PSCCH region (e.g., the SCI-1) and the second SCI part included in the PSSCH region (e.g., the SCI-2). In other aspects, control information may be indicated in a media access control (MAC) control element (MAC-CE) portion of the PSSCH.

Some examples of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as V2X communications. As an example, in FIG. 1, a UE 104, e.g., a transmitting Vehicle User Equipment (VUE) or other UE 104, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 3. Although the following description may provide examples for V2X/D2D communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters.

The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 18T. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize andinitiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Further, although the present disclosure may focus on vehicle-to-pedestrian (V2P) communication and pedestrian-to-vehicle (P2V) communication, the concepts and various aspects described herein may be applicable to other similar areas, such as D2D communication, IoT communication, vehicle-to-everything (V2X) communication, or other standards/protocols for communication in wireless/access networks.

Referring again to FIG. 1, in certain aspects, the UE 104 may include a dual connectivity component 197 that is configured to send a first number of encoded packets from a RLC layer to a network coding layer. The dual connectivity component 197 is configured to recover a second number of source packets from the first number of encoded packets with a rateless network code at the network coding layer, in which the first number of encoded packets having a greater number of packets than the second number of source packets. The dual connectivity component 197 is configured to sequence the second number of source packets into an ordered set of source packets at the network coding layer. The dual connectivity component 197 also is configured to send the ordered set of source packets from the network coding layer to a PDCP layer. Furthermore, in certain aspects, the base station 102/180 may include a dual connectivity relay configuration component 198 that is configured to receive a first number of source packets from a packet data convergence protocol (PDCP) layer. The dual connectivity relay configuration component 198 is configured to encode the first number of source packets into a second number of encoded packets with a rateless network code at a first network coding layer. The dual connectivity relay configuration component 198 is configured to send the second number of encoded packets from the first network coding layer to a first RLC layer. The dual connectivity relay configuration component 198 also is configured to transmit, to a user equipment, encoded data comprising the second number of encoded packets. In other implementations, the dual connectivity relay configuration component 198 is configured to receive a first number of source packets at a PDCP layer. The dual connectivity relay configuration component 198 is configured to send the first number of source packets from the PDCP layer to a first network coding layer of the base station. The dual connectivity relay configuration component 198 also is configured to encode the first number of source packets into a second number of encoded packets with a rateless network code at the first network coding layer. Furthermore, in certain aspects, the RSU 107 may include a relaying component 199 that is configured to receive, at a RLC layer, a first group of encoded packets from a network coding layer. The relaying component 199 also is configured to transmit, to a user equipment, the first group of encoded packets, the first group of encoded packets being associated with a second group of encoded packets at a base station. Further related aspects and features are described in more detail in connection with FIGS. 5-19. Although the following description may be focused on 5G NR, the concepts described herein may be applicable to other similar areas, such as LTE, LTE-A, CDMA, GSM, and other wireless technologies.

Figures 2A, 2B, 2C, 2D:
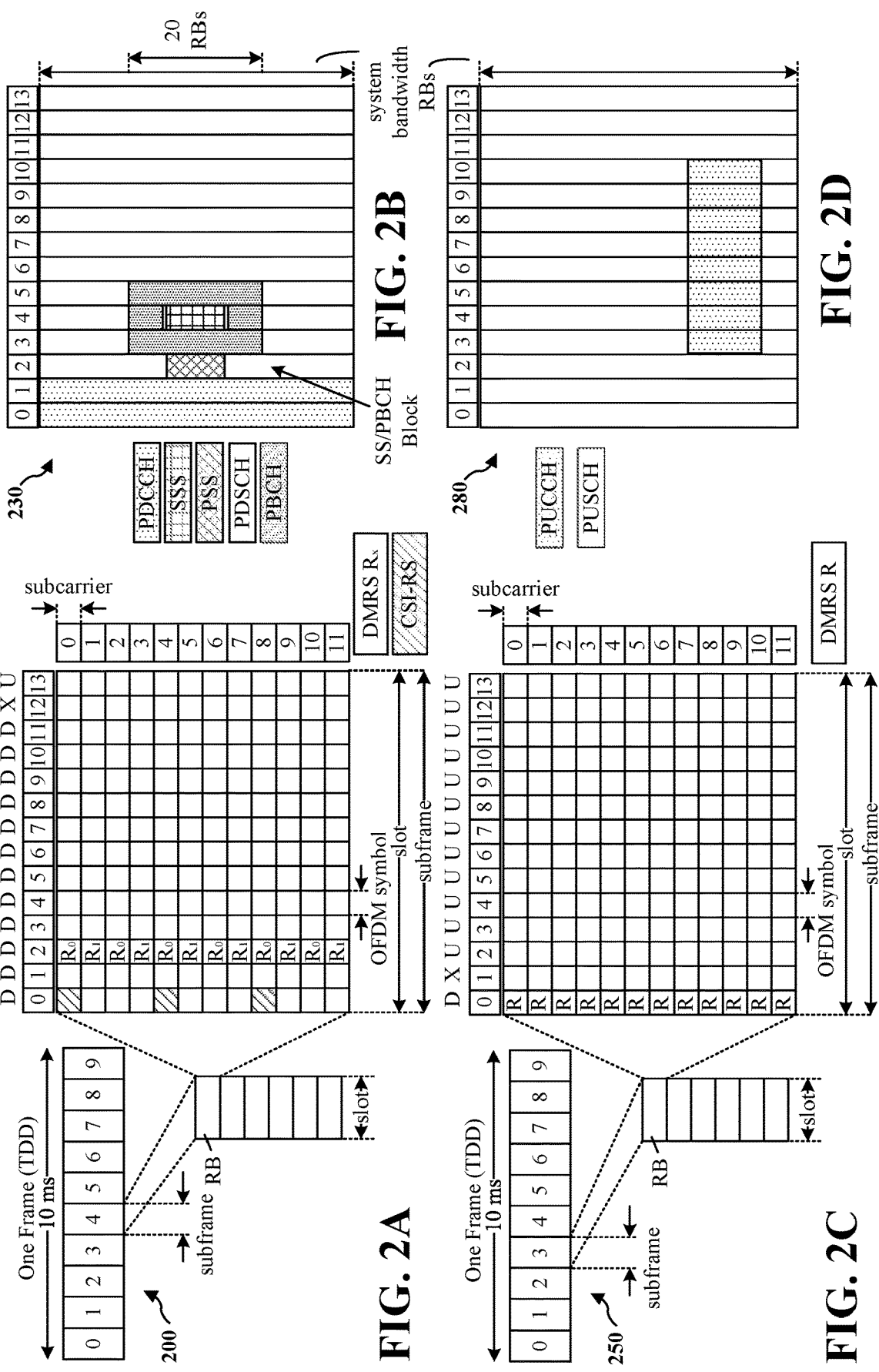
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. In some aspects, the DCI carries DFI. The DFI may be used for handling the HARQ-ACK protocol in conjunction with a CG transmission in the uplink. The DFI may be transmitted using the PDCCH scrambled with CS-RNTI, such that no new physical channel is defined. Rather, the DCI format 0_1 frame structure is reused with a DFI flag indicating whether the remainder of the DCI is to be interpreted as an uplink scheduling grant or downlink feedback information. To distinguish usage of the DCI for activation/deactivation CG transmission and DFI, a 1 bit flag (serving as an explicit indication) is used, when type 1 and/or type 2 CG PUSCH is configured. If the DFI flag is set, the remainder of the DCI is interpreted as a bitmap to indicate positive or negative acknowledgment for each HARQ process contained within the DFI. The DFI size may be aligned with the UL grant DCI format 0_1 size. For example, reserved bits may be included to ensure the overall size of the DFI is equivalent to the DCI format 0_1 frame structure size regardless whether the DCI format 0_1 frame structure size carries an uplink grant or downlink feedback information, thus, the number of blind decoding attempts is not increased. In this regard, the UE blind decoding complexity is not increased due to matching sizes. In some aspects, the content of DFI includes: (1) a 1 bit UL/downlink (DL) flag, (2) a 0- or 3-bit carrier indicator field (CIF), 3 bits are used in the case of a cross carrier scheduled is configured, (3) the 1-bit DFI flag, used to distinguish between DCI format 0_1 based activation/deactivation and DFI, (4) 16-bit HARQ-ACK bitmap, (5) 2-bit transmit power control (TPC) command, and (6) any zero-padding to match the length of the DCI format 0_1 frame structure.

A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
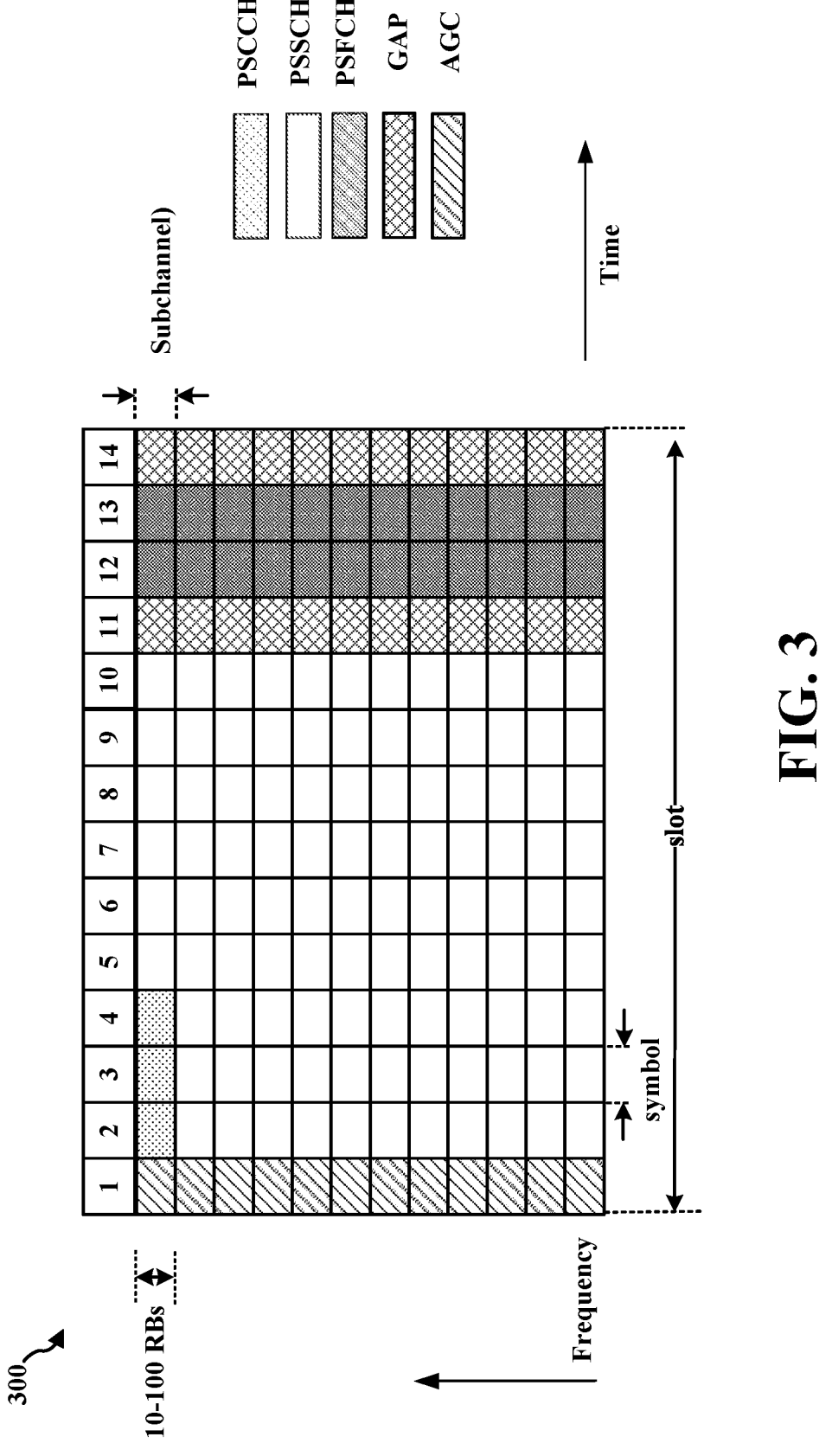
FIG. 3 illustrates example aspects of a sidelink slot structure.

FIG. 3 illustrates example diagram 300 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI).

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 300 also illustrates multiple subchannels, where each subchannel may include multiple RBs. For example, one subchannel in sidelink communication may include 10-100 RBs. As illustrated in FIG. 3, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 3 also illustrates symbol(s) that may include PSSCH. The symbols in FIG. 3 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 3, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 3, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 3.

Figure 4:
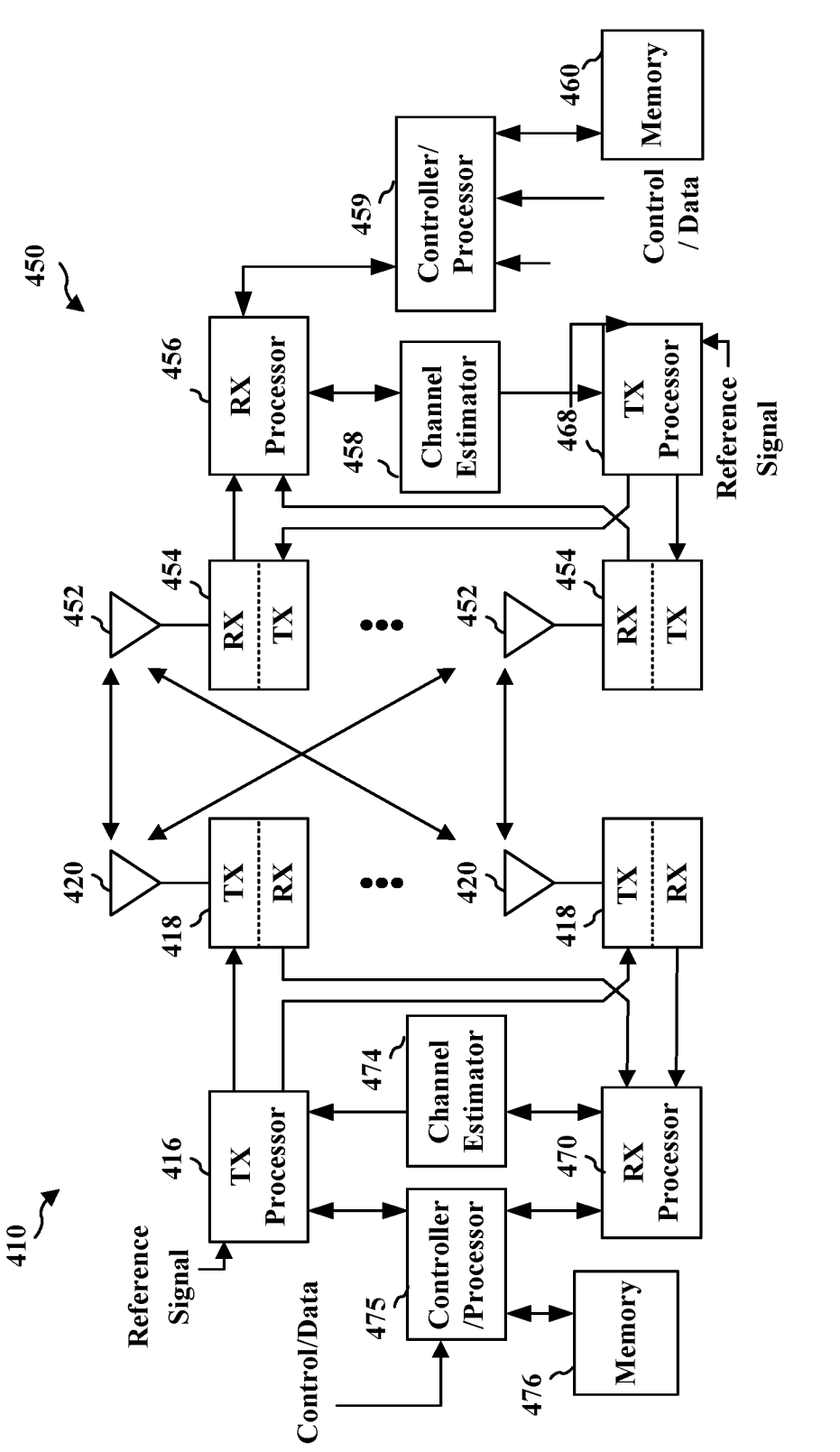
FIG. 4 is a block diagram of a first wireless communication device in communication with a second wireless communication device.

FIG. 4 is a block diagram of a first wireless communication device 410 in communication with a second wireless communication device 450. The communication may be based on sidelink, e.g., using a PC5 interface. In some examples, the devices 410 and 450 may communicate based on V2X or other D2D communication. The devices 410 and the 450 may include a UE, an RSU, a base station, etc. In some examples, the device 410 may be a UE and the device 450 may be a UE. Packets may be provided to a controller/processor 475 that implements layer 4 and layer 2 functionality. Layer 4 includes a radio resource control (RRC) layer, and layer 2 includes a packet data convergence protocol (PDCP) layer, a radio link control (RLC) layer, and a medium access control (MAC) layer.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an ACK and/or NACK protocol to support HARQ operations.

Similar to the functionality described in connection with the transmission by device 410, the controller/processor 459 may provide RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing. The controller/processor 475 is also responsible for error detection using an ACK and/or NACK protocol to support HARQ operations.

At least one of the TX processor 468, the RX processor 456, or the controller/processor 459 of device 450 or the TX 416, the RX processor 470, or the controller/processor 475 may be configured to perform aspects described in connection with the dual connectivity relay configuration component 198 and/or the relaying component 199 of FIG. 1.

Figure 5:
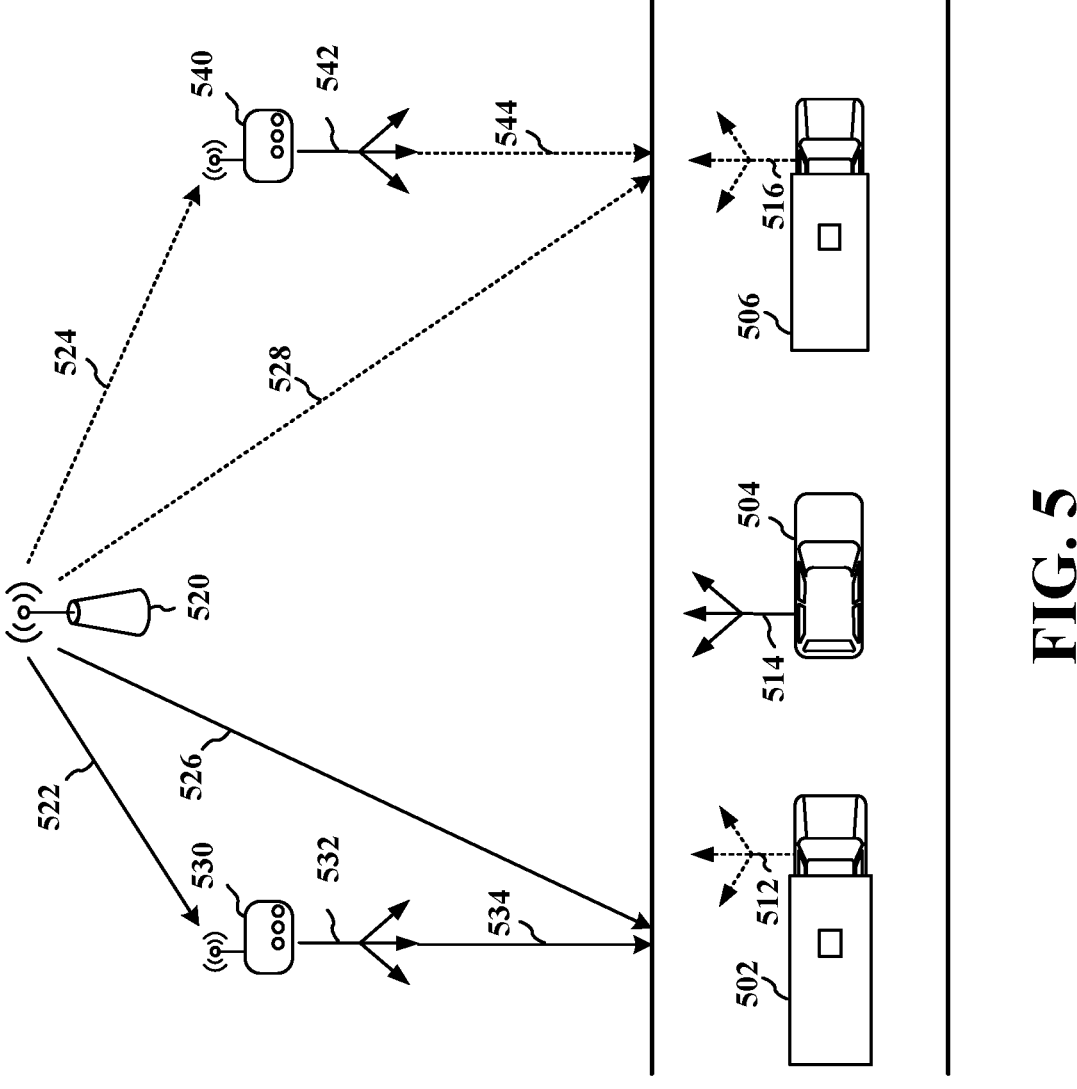
FIG. 5 illustrates an example of dual connectivity with direct link communication and sidelink communication between wireless devices.

FIG. 5 illustrates an example 500 of dual connectivity with direct link communication and sidelink communication between wireless devices. The communication may be based on a slot structure comprising aspects described in connection with FIGS. 2A-2D, 3 or another slot structure. The example 500 illustrates UEs 502, 504, 506; RSUs 530, 540, and base station 520. Although the example in FIG. 5 is described for the UEs 502, 504, 506, aspects may be applied to other wireless devices configured for communication based on sidelink, such as an RSU, an IAB node, etc. The UEs 502, 504, 506 may each be capable of operating as a transmitting device in addition to operating as a receiving device. Thus, the UEs 502, 504, 506 are illustrated as respectively transmitting transmissions 512, 514 and 516. The transmissions 512, 514 or 516 may be broadcast or multicast to nearby devices. For example, the UE 502 may transmit communication intended for receipt by other devices within a range of the UE 502. In other examples, the transmissions 512, 514, or 516 may be groupcast to nearby devices that is a member of a group. In other examples, the transmissions 512, 514, or 516 may be unicast from one UE to another UE. The base station 520 may respectively receive communication from and/or transmit communications via links 526 and 528 to the UEs 502, 504, 506 over Uu direct communication links. Additionally or alternatively, the RSUs 530, 540 may each be capable of operating as a transmitting device in addition to operating as a receiving device. Thus, the RSUs 530, 540 are illustrated as respectively transmitting transmissions 532, 542. The transmissions 532, 542 may be broadcast, multicast or unicast to nearby devices. For example, the RSUs 530 and 540 may respectively receive communication from and/or transmit communications 534 and 544 to the UEs 502, 504, 506 over sidelink (e.g., PC5). In some aspects, the base station 520 may respectively receive communication from and/or transmit communications 522 and 524 to the RSUs 530 and 540 over a backhaul link (e.g., X2 interface).

In some examples, sidelink communication may include V2X communication. V2X communication involves the wireless exchange of information directly between not only vehicles (e.g., UEs 502, 504, 506) themselves, but also directly between vehicles andinfrastructure (e.g., RSUs 530, 540), such as streetlights, buildings, traffic cameras, toll-booths or other stationary objects, vehicles and a pedestrian (not shown), and vehicles and wireless communication networks (e.g., base station 520). V2X communication enables UEs 502, 504, 506 (as, or as part of, the vehicles) to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving andimprove road safety and traffic efficiency. For example, the exchanged V2X data may be utilized by a V2X connected vehicle (e.g., UEs 502, 504, 506) to provide in-vehicle collision warnings, road hazard warnings, approaching emergency vehicle warnings, pre-/post-crash warnings andinformation, emergency brake warnings, traffic jam ahead warnings, lane change warnings, intelligent navigation services, and other similar information. In addition, V2X data received by a V2X connected UE of a pedestrian (or cyclist) may be utilized to trigger a warning sound, vibration, flashing light, etc., in case of imminent danger.

The UEs 502, 504, 506 may include a dual connectivity component, similar to the dual connectivity component 197 described in connection with FIG. 1. The base station 520 may additionally or alternatively include a dual connectivity relay configuration component, similar to the dual connectivity relay configuration component 198 described in connection with FIG. 1. The RSUs 530 and 540 may additionally or alternatively include a relaying component, similar to the relaying component 199 described in connection with FIG. 1.

In one or more implementations, each of the UEs 502, 504, 506 may have dual connectivity with the base station 520 and the RSUs 530, 540. In some aspects, the base station 520 serves as a master node base station associated with a first radio access technology (RAT). In some aspects, one or more of the RSUs 530, 540 serves as a secondary node base station associated with a second RAT. In some aspects, the first RAT is a 5G NR access technology and the second RAT is a 4G LTE access technology. In other aspects, both the first RAT and the second RAT are 5G NR access technologies. In some aspects, the first RAT is a 4G LTE access technology and the second RAT is a 5G NR access technology. For example, the base station 520 may serve as a master 5G NR base station and at least one of the RSUs 530, 540 may server as a secondary 5G NR base station. In another example, the base station 520 may serve as a master 5G NR base station and at least one of the RSUs 530, 540 may server as a secondary 4G LTE base station. In still another example, the base station 520 may serve as a master 4G LTE base station and at least one of the RSUs 530, 540 may server as a secondary 5G NR base station.

As shown in FIG. 5, a transmitter (Tx) RSU 530 and a receiver (Rx) UE 502 may communicate with one another via a sidelink channel (e.g., 534). In a dual connectivity mode, a base station (e.g., 520) may communicate with the Rx UE 502 via a first access link (e.g., 526). Additionally, or alternatively, in a dual connectivity mode, the base station 520 may communicate with another receiver (e.g., UE 506) via a second access link (e.g., 528). In the dual connectivity mode, the base station 520 may communicate with the RSU 530 via a first backhaul link (e.g., 522). Additionally, or alternatively, in the dual connectivity mode, the base station 520 may communicate with another RSU (e.g., RSU 540) via a second backhaul link (e.g., 524). The Rx UE 502 and/or the Rx UE 506 may correspond to one or more UEs described elsewhere herein, such as the UE 104 of FIG. 1. Thus, a direct link connection between UEs 104 (e.g., via a PC5 interface) may be referred to as a sidelink, a direct link connection between a base station 102/180 and a RSU 107 (e.g., via a X2 interface) may be referred to as a backhaul link, and a direct link between a base station 102/180 and a UE 104 (e.g., via a Uu interface) may be referred to as an access link. Sidelink communications may be transmitted via the sidelink, and access link communications may be transmitted via the access link. An access link communication may be either a downlink communication (from a base station 102/180 to a UE 104) or an uplink communication (from a UE 104 to a base station 102/180).

In 5G NR, dual connectivity may increase data rate per UE by allowing data from one radio bearer be separately transmitted between multiple network entities (e.g., base station and/or RSU) to the same UE. In dual connectivity, the base station maintains a U-plane connection with the core network and maintains a C-plane connection toward the MME. While dual connectivity may improve some aspects of communication between wireless communication apparatuses, such as by increasing throughput speed and/or amount, some issues may arise when dual connectivity is configured in practice. In some scenarios, dual connectivity may be relatively inefficient when sending PDUs, such as PDU of a PDCP layer. For example, out-of-order PDU delivery to the receiving apparatus from the transmitting apparatus when splitting transmission of PDCP PDUs for dual connectivity may increase latency. In some cases, the latency may be very high if the packets arranged at and/or near the beginning of a transmission sequence are received later than expected. Such a latency increase may be detrimental to URLLC, MBMS, IAB and/or other low-latency services or use cases. This split transmission of PDUs may be wasteful because there is a significant cost of distributed RRM. The consumption (and potential waste) of resources due to PDU split transmission may be increased when channel conditions (e.g., physical channel conditions) between a transmitting apparatus and a receiving apparatus are relatively poor (e.g., requiring additional retransmissions under dynamic link states). Flow control of U-plane data between the base station and the RSU may need to be monitored to avoid any underflow or overflow of data in the RSU. Thus, a need exists to improve communication of PDUs using dual connectivity.

The present disclosure describes various techniques and solutions for improving communication of PDUs, such as PDUs communicated using dual connectivity with Uu direct link connections and sidelink-based relays between UEs and the core network. For example, the present disclosure provides for adding a network coding layer in the protocol stack for encoding a dataset through different paths using network coding in order to mitigate one or more of the aforementioned issues potentially arising due to dual connectivity, such as by reducing wastefulness and/or decreasing latency due to out-of-order PDU delivery. In some aspects of the present disclosure, encoding a dataset from at least one SDU using network coding may obviate the need for in-order PDU delivery because network coding may not rely on in-order reception of PDUs. In this regard, there may be no requirement on the ordering of the received encoded packets from different paths at a radio link control (RLC) layer of the receiving apparatus if the receiving apparatus includes an additional network coding layer. In addition, the latency associated with split transmissions may be reduced because the number of encoded packets through different paths can be dynamically adjusted, thus providing better link coverage with more encoded packets at the receiving apparatus. Further, wastefulness may be reduced because all the received PDUs may be used for decoding by the receiving apparatus, regardless of the transmission path on which a PDU is received.

As illustrated in FIG. 5, the base station 520 has two transmission paths for dual connectivity, namely a first transmission path to a UE (e.g., the UE 502 via access link 526) and a second transmission path to a RSU (e.g., the RSU 530 via backhaul link 522). The base station 520 may process a first number of source packets from a PDCP layer in the base station 520. The base station 520 may encode the first number of source packets into a second number of encoded packets with a rateless network code (e.g., Raptor code) at a first network coding layer in the base station 520. The base station 520 may send the second number of encoded packets from the first network coding layer to a first RLC layer in the base station 520. In turn, the base station 520 can transmit, to the UE 502, encoded data comprising the second number of encoded packets.

In other aspects, the base station 520 may receive a first number of source packets at the PDCP layer. In this regard, the base station 520 may send the first number of source packets from the PDCP layer to the first network coding layer of the base station 520. The base station may encode the first number of source packets into a second number of encoded packets with the rateless network code at the first network coding layer.

In one or more implementations, the base station 520 may determine, at a RRC layer of the base station 520, a pre-configured threshold that corresponds to a total size of encoded packets to the base station 520. In some aspects, the base station 520 may determine whether the second number of encoded packets satisfies the pre-configured threshold to determine whether any of the encoded packets should be sent to the RSU 530 as part of the split transmission via dual connectivity. In some aspects, the base station 520 can pass a first portion of the second number of encoded packets to the first RLC layer at the base station and transmit a second portion of the second number of encoded packets to a second RLC layer at a RSU (e.g., RSU 530) over a RAN interface, such as the backhaul link 522, when the second number of encoded packets satisfies the pre-configured threshold. In other aspects, the base station may pass the second number of encoded packets exclusively to the first RLC layer when the second number of encoded packets does not satisfy the pre-configured threshold, where in this regard no packets are transmitted to the RSU 530.

The RSU 530, for example, may receive, at the RLC layer, the second portion of the second number of encoded packets from the network coding layer of the base station 520. The RSU can transmit, to a UE (e.g., UE 502), the second portion of the second number of encoded packets. In some aspects, the second portion of the second number of encoded packets is associated with the first portion of the second number of encoded packets at the base station 520. In other implementations, the RSU 530 may receive a first group of source packets at a network coding layer in the RSU 530 from the PDCP layer of the base station 520. In some aspects, the first group of source packets is associated with a second group of source packets at the base station 520. The RSU 530 may encode the first group of source packets into the first group of encoded packets with a rateless network code (e.g., Raptor code) at the network coding layer. In turn, the RSU 530 can pass the first group of encoded packets from the network coding layer to the RLC layer.

The UE 502, for example, may receive a first number of encoded packets at a RLC layer and pass to a network coding layer in the UE 502 for recovery of the original source packets. The UE 502 may recover a second number of source packets from the first number of encoded packets with a rateless network code (e.g., Raptor code) at the network coding layer. As described above, the transmit packets from both the base station 520 and the RSU 530 can be recovered at the UE 502 as long as the number of received packets is slightly larger than that of the source packets no matter which packets are received. In this regard, the first number of encoded packets may include a greater number of packets than the second number of source packets. The network coding layer is responsible for source packet recovery, reassembly, ordering, and delivery of the ordered packets to the PDCP layer. The UE 502 can sequence the second number of source packets into an ordered set of source packets at the network coding layer. In turn, the UE 502 can send the ordered set of source packets from the network coding layer to the PDCP layer in the UE 502.

In some aspects of recovering the source packets, the UE 502 may decode the first number of encoded packets into a third number of decoded packets. The UE 502 may determine whether the third number of decoded packets exceeds the second number of source packets. The UE 502 can generate feedback at the network coding layer based on the determining of whether the third number of decoded packets exceeds the second number of source packets. In some aspects, the feedback may indicate whether additional encoded packets are needed to recover at least a portion of the second number of source packets.

Figure 6:
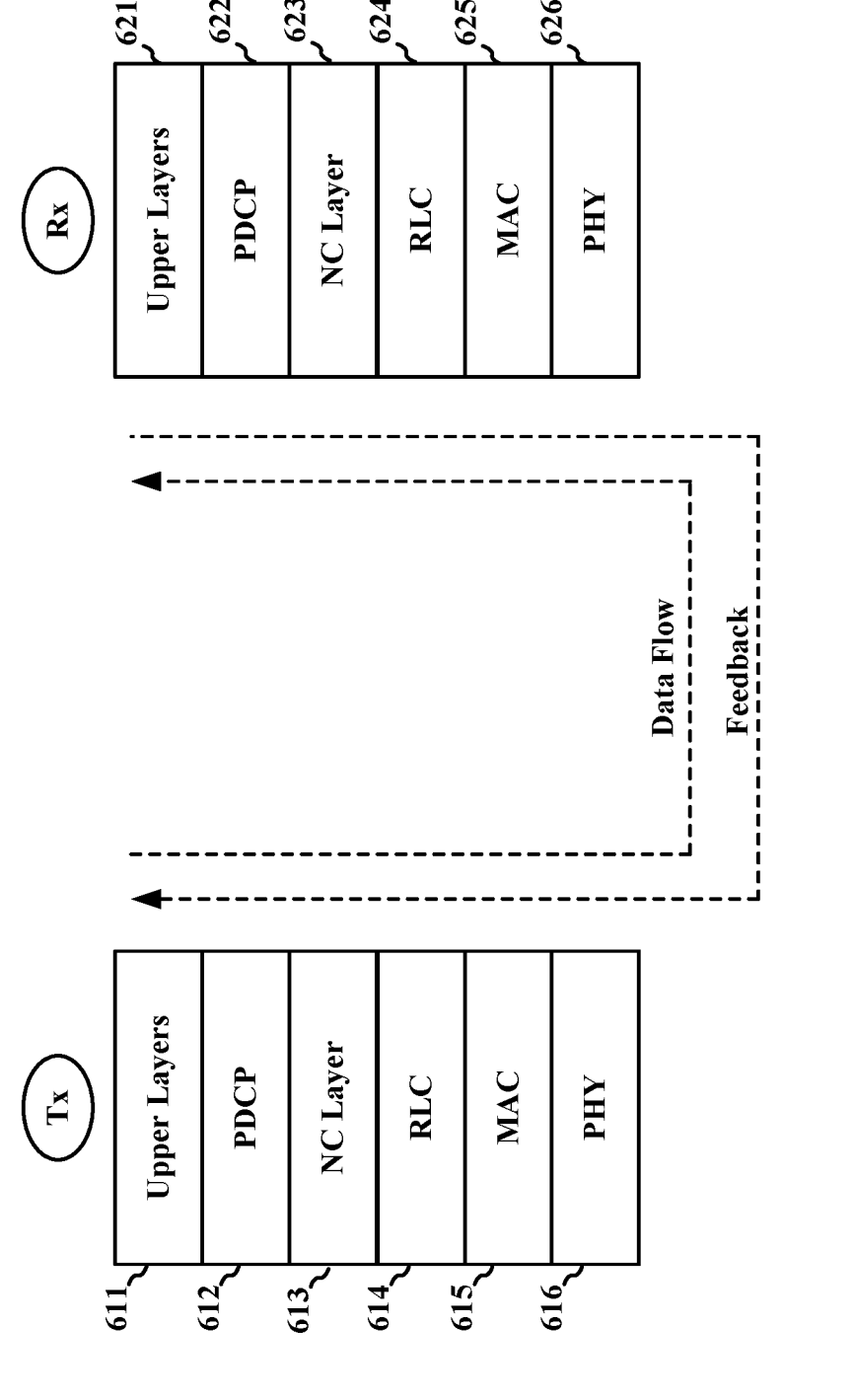
FIG. 6 is a diagram illustrating a protocol stack for a transmitter and a protocol stack for a receiver.

FIG. 6 is a diagram 600 illustrating a protocol stack for a transmitter and a protocol stack for a receiver. The protocol stack for the transmitter includes upper layers 611, a PDCP layer 612, a network coding layer 613, a RLC layer 614, a MAC layer 615, and a PHY layer 616. In some aspects, the network coding layer 613 may be a sub-layer of the PDCP layer 612. In other aspect, the network coding layer 613 may be a sub-layer of the RLC layer 614. In still other aspects, the network coding layer 613 may be separate from the PDCP layer 612 and the RLC layer 614. The protocol stack for the receiver includes upper layers 621, a PDCP layer 622, a network coding layer 623, a RLC layer 624, a MAC layer 625, and a PHY layer 626. In some aspects, the network coding layer 623 may be a sub-layer of the PDCP layer 622. In other aspect, the network coding layer 623 may be a sub-layer of the RLC layer 624. In still other aspects, the network coding layer 623 may be separate from the PDCP layer 622 and the RLC layer 624.

Data transmitted from a transmitter (e.g., base station 520) to a receiver (e.g., UE 502) may be processed down through the protocol stack for the transmitter and transmitted to the receiver at the PHY layer of the transmitter. The receiver may receive the transmission at the PHY layer of the receiver and may process the received transmission up through the protocol stack for the receiver.

The network coding layer 613 of the transmitter and the network coding layer 623 of the receiver may enable the transmitter and the receiver to utilize network coding to communicate a packet over a network. In particular, the network coding layer 613 of the transmitter may encode a first number of source packets into a second number of encoded packets to be transmitted to the receiver. The network coding layer 613 of the transmitter may utilize a network coding algorithm to encode the source packets into the encoded packets. Finally, the network coding layer 613 of the transmitter may forward the encoded packets to the RLC layer 614 of the transmitter. The RLC layer 614 of the transmitter may generate RLC packet data units based on the encoded packets.

The network coding layer 623 of the receiver may buffer received RLC packet data units received from the RLC layer 624 of the receiver. The network coding layer 623 of the receiver may determine the encoded packets from the buffered RLC packet data units, and may decode the encoded packets to determine the source packets. Finally, the network coding layer 623 of the receiver may push the decoded packets to the PDCP layer 622 of the receiver.

The receiver may generate feedback information related to the number of encoded packets utilized to recover the source packet, and/or whether the source packet was successfully decoded. Feedback from the receiver to the transmitter may be processed down through the protocol stack for the receiver and transmitted to the transmitter at the PHY layer of the transmitter. The transmitter may receive the feedback transmission at the PHY layer of the transmitter and may process the received transmission up through the protocol stack for the receiver.

In some aspects, the feedback includes a PDCP status report. The PDCP layer 622 may generate the PDCP status report, and may include a field which identifies the number of encoded packets utilized by the network coding layer 623 to determine the source packet. The PDCP layer 622 may forward the PDCP status report to the network coding layer 623 and down the protocol stack for transmission to the transmitter. The transmitter may receive the PDCP status report and may determine the number of encoded packets used to determine the source packet based on the field in the PDCP status report.

In some aspects, the feedback includes a RLC status report. The RLC layer 624 may generate the RLC status report, and may include a field which identifies the number of encoded packets utilized by the network coding layer 623 to determine the source packet. Specifically, the receiver may count the RLC packet data units received at the RLC layer 624, and may transmit a RLC status message with a field indicating the number of received RLC packet data units upon determination that the source packet has been recovered. The RLC layer 624 may forward the RLC status report down the protocol stack for transmission to the transmitter. The transmitter may receive the RLC status report and may determine the number of encoded packets used to determine the source packet based on the field in the PDCP status report.

In some aspects, the feedback includes a RLC status report and/or includes acknowledgements (e.g., ACKs) of RLC packet data units. The RLC layer 624 may generate the RLC status report, and the RLC status report may include acknowledgements of RLC packet data units received from the transmitter at the RLC layer 624 of the receiver. The RLC packet data units may include the encoded packets. The RLC layer 624 may forward the RLC status report down the protocol stack for transmission to the transmitter. The transmitter may receive the RLC status report and may count the number of acknowledgements of RLC packet data units. In some aspects, the acknowledgments may infer both positive acknowledgments and negative acknowledgments. Upon receiving confirmation that the receiver has decoded the source packet, the transmitter may utilize the counted acknowledgements to infer the number of encoded packets used to determine the source packet. In some aspects, the RLC status report may include non-acknowledgments such that the transmitter may count the number of non-acknowledgments to infer the number of encoded packets not received to recover the source packets. The RLC status report may indicate a sequence number associated with each missing encoded packet. In this regard, the transmitter can regenerate and transmit the identified the missing encoded packets by their sequence number.

In some aspects, the feedback includes a MAC HARQ report and/or includes acknowledgements (e.g., ACKs) of the HARQ report. The MAC layer 625 of the receiver may generate HARQ/ACK feedback based on RLC packet data units containing the encoded packets, and may transmit the HARQ/ACK feedback to the transmitter. The transmitter may determine that RLC packet data units that were transmitted to the receiver are acknowledged in the HARQ/ACK feedback, and may count the number of acknowledgments. Upon receiving confirmation that the receiver has decoded the source packet, the transmitter may utilize the counted acknowledgements to infer the number of encoded packets used to determine the source packet.

Techniques and approaches to encoding a dataset using fountain codes is described. To provide this functionality, devices can use rateless network codes for encoding communications, such as fountain codes. Fountain codes can be rateless network codes with an original generator matrix that has an unlimited number of columns, where each column can correspond to an encoded packet for transmission. The source packets can be recovered at a receiving device as long as the number of received packets is slightly larger than that of the source packets no matter which packets are received. Using fountain codes, given transmitted packets $$p_j = \sum_{k=1}^{K} s_k G_{kj},$$

where $s_k$ is a source packet, K is the number of source packets, and G is an original generator matrix, the received and recovered packets can be represented as $$r_k = \sum_{n=1}^{N} p_n G'^{-1}_{nk},$$

where N is the number of received encoded packets and G' is the K*N matrix after combining the received columns. For example, a receiving device may not receive all of the transmitted packets (e.g., all of the columns); the receiving device can combine the received packets (e.g., the received columns), N, to generate the K*N matrix, from which the transmitted data can be recovered (e.g., where the number or order of received packets allows for successful recovery). In addition, the receiving device can use the received packets having correct cyclic redundancy check (CRC) in the decoding process. As a condition for recovering the packets, for example, G' can be invertible according to the received packets or the rank of G' can be K. In designing the generator matrix, G' can be invertible with a minimum N, such that where at least N packets (e.g. columns) are received, the corresponding data can be recovered. As a method to realize function of fountain codes, a Luby transform (LT) code, or Raptor code can be used to encode a collection of source symbols.

In an encoding process for each encoding symbol, a device can randomly choose a degree $d_i$ from a degree distribution and can randomly choose $d_i$ distinct source symbols with uniformly distribution and XOR them. In a decoding process, a device can find an encoded symbol $t_j$ that is connected to only one source symbol $s_i$. The device can set $s_i = t_j$, XOR $s_i$ to all encoded symbols that are connected to $s_i$, and then remove all the edges connected to the source symbol $s_i$. The device can repeat this process until all $s_i$ are determined. If there is no encoded symbol that is connected to only one source symbol, then the decoding process fails. In an example, Raptor codes can be used to reduce encoding and decoding complexities of LT codes by reducing the average degree. As part of a precoding process for a set of source symbols, a device can generate some redundant symbols for encoding. For example, the device can generate a number S of low-density parity-check (LDPC) symbols (e.g., each source symbol can appear three times in all LDPC symbols), and a number H of half symbols (e.g., each encoded symbol can include ceil(H/2) source symbols). Then, for encoding the symbols, the device can randomly choose a degree $d_i$ from a degree distribution and can choose $d_i$ distinct source symbols with uniform distribution and XOR them. In this regard, Raptor codes are an enhancement over LT (e.g., LDPC+weak LT).

In an example, a device can partition each data of length n into K=n/l input symbols (e.g., each symbol contains l bits). The encoder of the device can use these K symbols to generate encoded symbols. For each data, a receiving device can recover with high probability when N encoded symbols are received due to the properties of Raptor codes.

Figure 7:
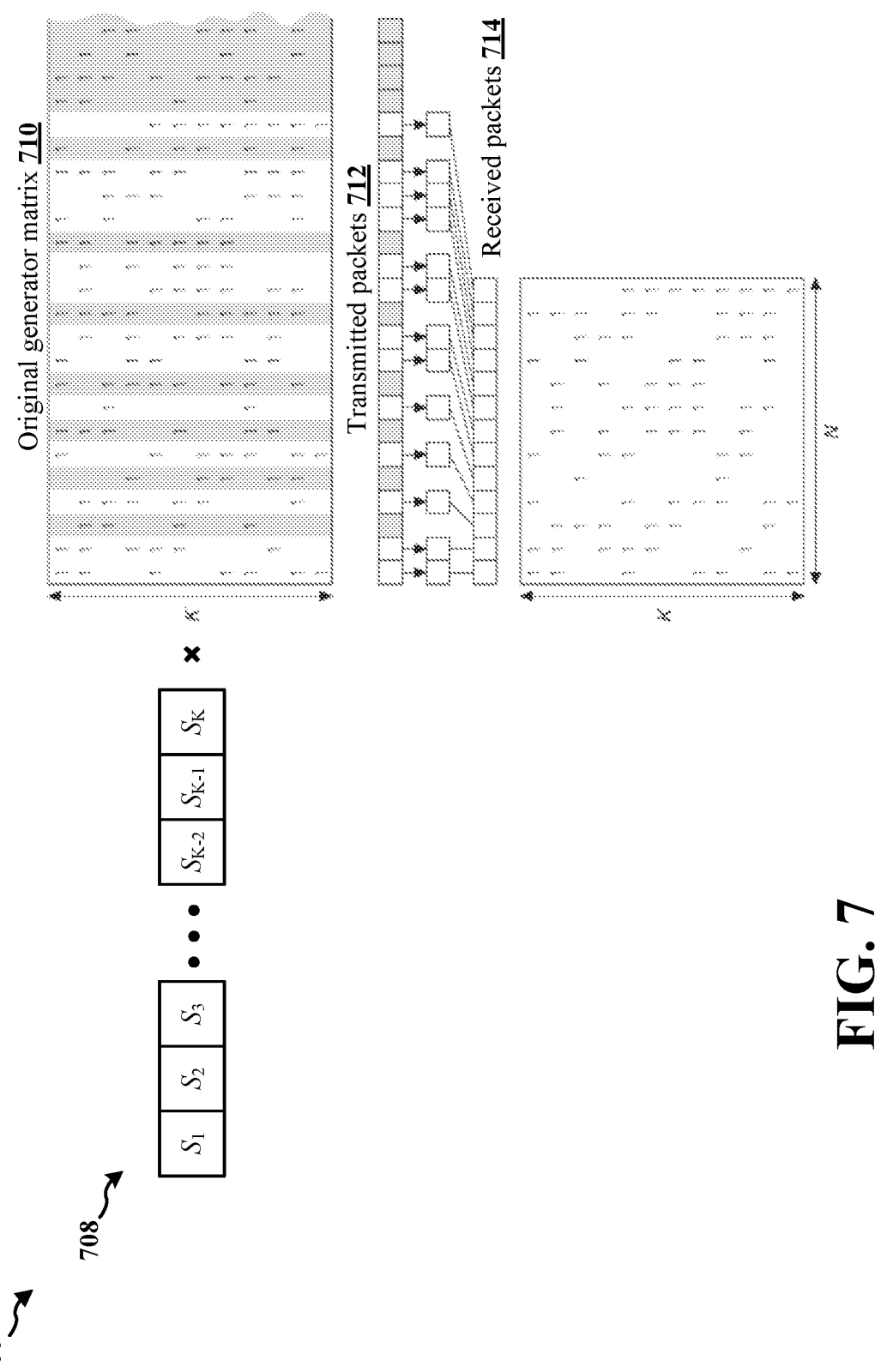
FIG. 7 is a diagram illustrating a system for encoding a dataset using fountain coding.

With reference to FIG. 7, a diagram illustrates a system 700 for encoding a dataset 708 using fountain coding. A dataset 708 may include a set of bits or symbols that is to be transmitted over a RAN to a receiving device. The dataset 708 may include data and/or control information.

The dataset 708 to be encoded may be obtained at one layer of a transmitting device as a set of SDUs $s_1, s_2, \ldots, s_{K-1}, s_K$. In order to encode the dataset 708, a transmitting device may first determine an original generator matrix 710. The original generator matrix 710 may include K rows, but may include a potentially unlimited number of columns. For network coding, then, a submatrix of the original generator matrix 710 may be determined. The submatrix may be known as a generator matrix G.

The transmitting device may determine the generator matrix G as a submatrix of an original generator matrix 710 (also known as a mother generator matrix). As a submatrix of the original generator matrix 710, the generator matrix G may be the K rows of the original generator matrix 710 and the first N columns of the original generator matrix 710. In addition, the generator matrix G may be invertible with minimum N. At the transmitting device, the number of columns can be greater than N. As discussed earlier, N may be the number of received encoded packets, where there may be some erasures for the channel.

To encode the dataset 708 based on the generator matrix, the transmitting device may multiply an entry (e.g., a bit or symbol) of the dataset with each entry of a column of a generator matrix G that corresponds to an index of the packet to be transmitted, and summing the products.

Thus, to obtain a packet $p_j$ of the transmitted packets 712, the transmitting device may multiply an entry $s_k$ (e.g., a bit or symbol) of the dataset 708 with each row entry of one column of the generator matrix G that corresponds to the index j of the packet $p_j$ to be transmitted, and summing the products, as shown in Equation 1.

$$p_j = \sum_{k=1}^{K} s_k G_{kj} \qquad \text{Eq. 1}$$

Correspondingly, the generator matrix G is invertible and/or the rank of the generator matrix G is K, which may allow the receiving device to recover each original entry (e.g., an original bit or symbol) of the dataset from each encoded entry (e.g., an encoded bit or symbol) received in a packet p. Thus, the receiving device may recover an entry $d_k$ (e.g., an original bit or symbol) from a packet $p_n$ of the received packets 714 by multiplying the encoded entry included in the packet $p_n$ with each row entry of one column of the inverse of the generator matrix $G^{-1}$ that corresponds to an index k of the entry $r_k$ that is to be recovered, and summing the products, as shown in Equation 2.

$$r_k = \sum_{n=1}^{N} p_n G_{nk}'^{-1} \qquad \text{Eq. 2}$$

The original generator matrix 710 may be determined by both the transmitting and receiving devices. For example, the transmitting device may generate the original generator matrix 710 and then send the original generator matrix 710 to the receiving device. Alternatively, the original generator matrix 710 may be preconfigured in at least one of the transmitting and/or receiving devices. For example, the original generator matrix 710 may be defined by at least one standard or technical specification promulgated by 3GPP. In some aspects, such as for conventional ARQ, the original generator matrix 710 may begin with the unit matrix.

Figure 8:
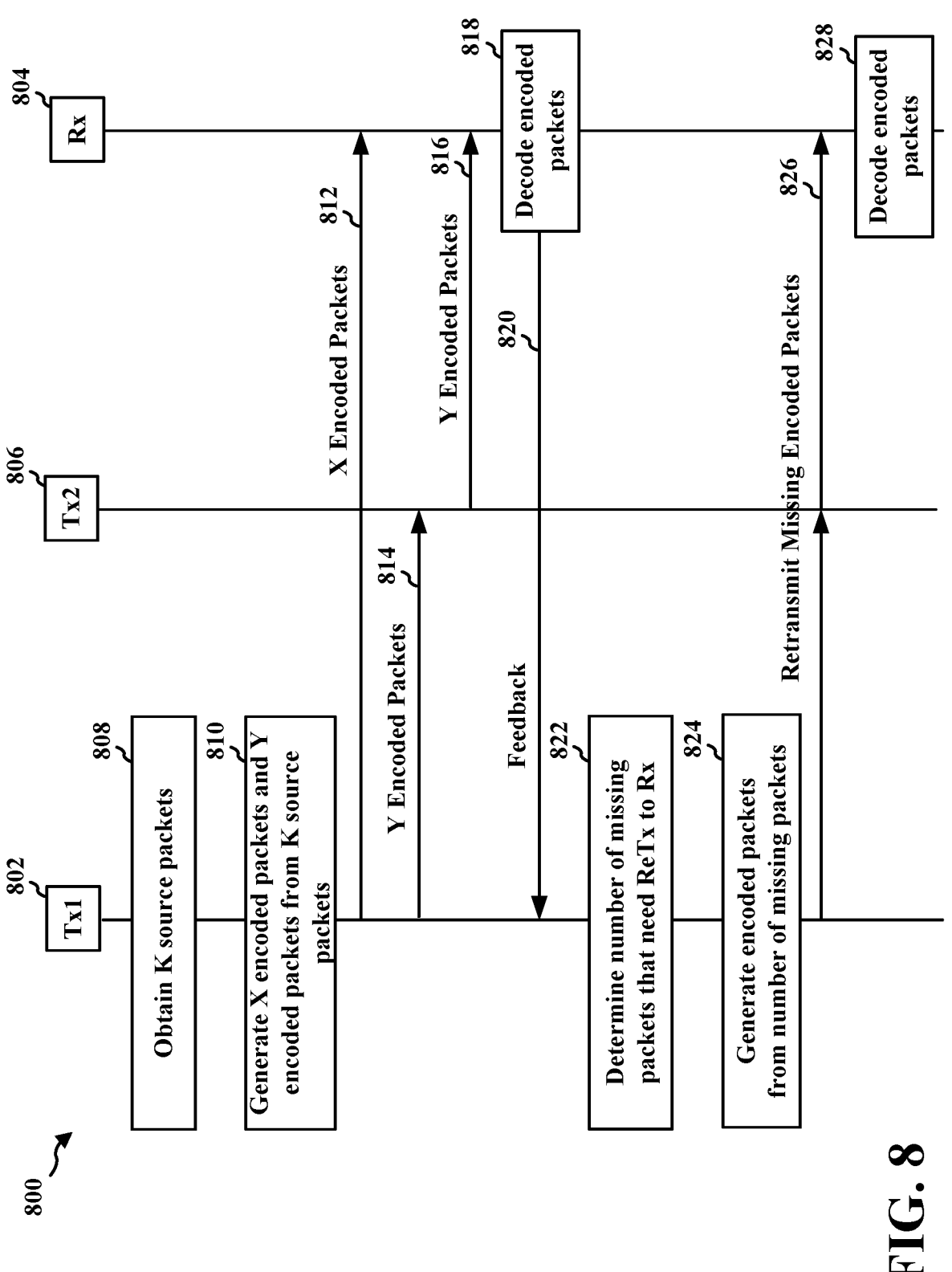
FIG. 8 is a communication flow diagram illustrating network coding in dual connectivity based on decoded packet feedback.

FIG. 8 is a communication flow diagram 800 illustrating network coding in dual connectivity based on decoded packet feedback. As illustrated in FIG. 8, a transmitter 802 communicates with a receiver 804 over a network (e.g., Uu direct link connection). The transmitter 802 also communicates with another transmitter 806 over a network (e.g., backhaul link connection). The transmitter 802 and the receiver 804 utilize network coding (e.g., Raptor code) to communicate a series of packets between the transmitter 802 and the receiver 804 on the network. In some aspects, the transmitter 802 may be a UE and the receiver 804 may be a base station. In some aspects, the transmitter 802 may be a base station and the receiver 804 may be a UE. In some aspects, the transmitter 806 may be an RSU. In some aspects, the network may be a wireless communication network (e.g., a cellular communication network) operating on a mmWave frequency spectrum.

The transmitter 802 may determine to transmit a first packet to the receiver 804. As illustrated at 812, the transmitter 802 may obtain K source packets. Then, as illustrated at 810, the transmitter 802 may generate X encoded packets and Y encoded packets from the K source packets. The transmitter 802 may use a network code (e.g., Raptor code) to determine value of X and Y. The network code may account for a targeted error rate, encoding parameters, computation resources, and/or redundancy budget. In some aspects, the network code may be a Luby transform code. In some aspects, the network code may be a Raptor code.

The transmitter 802 may process a first number of source packets from a PDCP layer in the transmitter 802. The transmitter 802 may encode the first number of source packets into a second number of encoded packets with a rateless network code (e.g., Raptor code) at a first network coding layer in the transmitter 802. The transmitter 802 may send the second number of encoded packets from the first network coding layer to a first RLC layer in the transmitter 802. In turn, the transmitter 802 can transmit, to the receiver 804, encoded data comprising the second number of encoded packets.

In other aspects, the transmitter 802 may receive a first number of source packets at the PDCP layer. In this regard, the transmitter 802 may send the first number of source packets from the PDCP layer to the first network coding layer of the transmitter 802. The base station may encode the first number of source packets into a second number of encoded packets with the rateless network code at the first network coding layer.

As illustrated at 812, the transmitter 802 may transmit the X encoded packets 822 to the receiver 804. In some aspects, the transmitter 802 may determine, at a RRC layer of the transmitter 802, a pre-configured threshold that corresponds to a total size of encoded packets for the transmitter 802. In one or more implementations, the transmitter 802 may determine whether the second number of encoded packets satisfies the pre-configured threshold to determine whether any of the encoded packets should be sent to the transmitter 806 as part of the split transmission via dual connectivity. In some aspects, the transmitter 802 can pass a first portion of the second number of encoded packets (e.g., X encoded packets) to the first RLC layer at the base station and transmit a second portion of the second number of encoded packets (e.g., Y encoded packets) to a second RLC layer at the transmitter 806 over a RAN interface, such as a X2 interface, when the second number of encoded packets satisfies the pre-configured threshold. In other aspects, the base station may pass the second number of encoded packets exclusively to the first RLC layer when the second number of encoded packets does not satisfy the pre-configured threshold, where in this regard no packets are transmitted to the transmitter 806.

As illustrated at 814, the transmitter 802 may transmit the Y encoded packets to the transmitter 806. As illustrated at 816, the transmitter 806 may forward the Y encoded packets to the receiver 804. The transmitter 806, for example, may receive, at the RLC layer, the second portion of the second number of encoded packets from the network coding layer of the transmitter 802. The transmitter 806 can transmit, to the receiver 804, the second portion of the second number of encoded packets. In some aspects, the second portion of the second number of encoded packets is associated with the first portion of the second number of encoded packets at the transmitter 802. In other implementations, the transmitter 806 may receive a first group of source packets at a network coding layer in the transmitter 806 from the PDCP layer of the transmitter 802. In some aspects, the first group of source packets is associated with a second group of source packets at the transmitter 802. The transmitter 806 may encode the first group of source packets into the first group of encoded packets with a rateless network code (e.g., Raptor code) at the network coding layer. In turn, the transmitter 806 can pass the first group of encoded packets from the network coding layer to the RLC layer.

Upon receiving at least one of the X encoded packets from the transmitter 802 and at least one of the Y encoded packets from the transmitter 806, the receiver 804 may begin to decode the received encoded packets to recover one or more source packets. The receiver 804 may use a decoding algorithm to decode the encoded packets. In some aspects, the decoding algorithm may be Belief Propagation decoding.

The receiver 804, for example, may receive a first number of encoded packets at a RLC layer and pass to a network coding layer in the receiver 804 for recovery of the original source packets. The first number of encoded packets may be a combination of X encoded packets and Y encoded packets. In some aspects, not all of X encoded packets and Y encoded packets may be received correctly at the receiver 804. The receiver 804 may recover a second number of source packets from the first number of encoded packets with a rateless network code (e.g., Raptor code) at the network coding layer. As described above, the transmit source packets can be recovered at the receiver 804 as long as the number of received encoded packets from both the transmitter 802 and the transmitter 806 is slightly larger than that of the source packets no matter which packets are received. In this regard, the first number of encoded packets may include a greater number of packets than the second number of source packets. The network coding layer is responsible for source packet recovery, reassembly, ordering, and delivery of the ordered packets to the PDCP layer. The receiver 804 can sequence the second number of source packets into an ordered set of source packets at the network coding layer. In turn, the receiver 804 can send the ordered set of source packets from the network coding layer to the PDCP layer in the receiver 804.

In some aspects, the receiver 804 may determine one or more source packets after decoding X' encoded packets of the X encoded packets. The value of X' can vary, e.g., based on the channel quality between the transmitter 802 and the receiver 804. Similarly, the receiver 804 may determine one or more source packets after decoding Y' encoded packets of the Y encoded packets. The value of Y' can vary, e.g., based on the channel quality between the transmitter 806 and the receiver 804.

In some aspects of recovering the source packets, the receiver 804 may begin decoding the first number of encoded packets (e.g., the combination of X' encoded packets and Y' encoded packets) into a third number of decoded packets. The receiver 804 may determine whether the third number of decoded packets exceeds the second number of source packets. If the number of decoded packets includes fewer packets than the number of source packets issued by the transmitter 802, then the receiver 804 may not recover the set of source packets.

The receiver 804 can generate feedback at the network coding layer based on the determination of whether all the second number of source packets can be recovered based on the first number of encoded packets received. Based on the description of FIG. 7, G' can be of full rank such that the K source packets can be recovered. In some aspects, the feedback may indicate whether additional encoded packets are needed to recover at least a portion of the second number of source packets. In some implementations, the receiver 804 receives a configuration that includes a preconfigured timer for the receiver 804 to report back any feedback to the transmitter 802. In other implementations, the receiver 804 may receive a semi-static indication that triggers the receiver 804 to report back the feedback to the transmitter 802.

As illustrated at 820, the receiver 804 may transmit feedback to the transmitter 802. In some aspects, the feedback may indicate the additional number of encoded packets required for recovering the set of source packets at the receiver 804. The feedback may be based on whether the set of source packets was recovered by the receiver 804 and the number of encoded packets used to recover the set of source packets (e.g., the value of X' and Y'). In some aspects, the feedback may identify the value of X' and/or Y'. The feedback may explicitly include the value of X' and/or Y', e.g., as an entry in a RLC status report or in a PDCP status report. In some aspects, the feedback may not explicitly indicate the value of X' and Y', but may include information which may allow the transmitter 802 to infer the value of X' and/or Y' from the feedback. For example, the feedback may include acknowledgements in response to the X encoded packets and/or the Y encoded packets (e.g., ACKed RLC packet data units, MAC layer HARQ/ACK feedback), and/or may include a confirmation indicating that one or more source packets has been recovered. Feedback will be discussed further below.

As illustrated at 822, the transmitter 802 may determine the number of missing packets that need to be retransmitted to the receiver 804 in order for the receiver 804 to recover the source packets. In some aspects, the transmitter 802 may determine the number of packets used by the receiver 804 to determine the one or more source packets (e.g., the value of X' and Y') from the X encoded packets and Y encoded packets, respectively. The transmitter 802 may utilize the feedback to make this determination. Where the feedback explicitly indicates the value of X' and Y', this may simply be receiving and reading the feedback. For example, the feedback may indicate a sequence number for each of the acknowledged and/or non-acknowledged encoded packets. In this regard, the transmitter 802 may identify which of the transmitted encoded packets are missing and require retransmission by their sequence number.

As the receiver 804 may feedback the additional number of encoded packets required for recovering the set of source packets, the transmitter 802 may transmit more encoded packets to the receiver 804. In some aspects, not all the encoded packets transmitted in a retransmission to the receiver 804 can be received correctly at the receiver 804. In this regard, the transmitter 802 may transmit more encoded packets than the number indicated in the feedback. For example, in the initial transmission, the transmitter 802 may transmit L encoded packets all together, then in the retransmission, the transmitter 802 may transmit the encoded packets starting from an index that corresponds to the L+1-th column of the original generator matrix 710.

In some aspects, determining the value of X' and Y' from the feedback may include inferring the value of X' and Y' based on the feedback. For example, the feedback may include acknowledgements of encoded packets from the X encoded packets (e.g., 812) and acknowledgments of encoded packets from the Y encoded packets (e.g., 816). The feedback may also include non-acknowledgments of the X encoded packets and/or the Y encoded packets. The feedback may also include a confirmation identifying that the receiver 804 has determined one or more source packets. Determining the value of X' and/or Y', as illustrated at 828, may including counting the number of acknowledgements received in the feedback 826 before receiving the confirmation in the feedback.

The transmitter 802 may determine to transmit a number of encoded packets to the receiver 804. The transmitter 802 may determine which encoded packets are missing based on their corresponding sequence number included in the feedback. In other aspects, the transmitter 802 may determine how many encoded packets beyond the number of source packets to retransmit without retransmitting any duplicate encoded packets. In some aspects, the feedback provided by the receiver 804 may indicate the additional number of encoded packets required for recovering the set of source packets at the receiver 804. Then, as illustrated at 824, the transmitter 802 may generate encoded packets based on the number of missing packets determined at 822. By specifically identifying the number of missing encoded packets based on the corresponding sequence numbers being included in the feedback, the transmitter 802 and the receiver 804 may reduce redundancy in the network coding, may reduce network coding computation complexity, may reduce delay in communicating over the network, and may save network resources, by avoiding the retransmission of an entire PDCP PDU.

Upon generating the missing encoded packets, at 826, the transmitter 802 may retransmit the missing encoded packets to the receiver 804.

In some aspects, the transmitter 802 may determine the value of X' based on the value of X and based on the number of encoded packets that had already been transmitted by the transmitter 802 when the receiver 804 successfully determined a first source packet from the X encoded packets. By comparing the number of encoded packets used to recover the first source packet with the number of encoded packets transmitted to the receiver 804 at the time the first source packet was recovered, the transmitter 802 may determine a number of encoded packets which were transmitted to the receiver 804 but were not received at the receiver 804. The transmitter 802 may account for a similar number of lost packets in determining Y', the number of encoded packets transmitted by the transmitter 806. In some aspects, the transmitter 802 may receive feedback from the transmitter 806 relating to the number of Y encoded packets transmitted by the transmitter 802 to the transmitter 806 at 816.

For example, the transmitter 802 may generate 32 encoded packets based on 16 source packets. In this regard, the transmitter 802 determines via the network coding layer that 20 encoded packets may be transmitted by the transmitter 802 and the remaining 12 encoded packets may be transmitted by the transmitter 806 to the receiver 804. The transmitter 802 may begin transmitting the 20 encoded packets to the receiver 804 over a Uu direct link connection and the remaining 12 encoded packets to the transmitter 806 over a backhaul link, where the transmitter 806 may forward the 12 encoded packets to the receiver 804 over a sidelink channel (e.g., PC5). The receiver 804 may receive 10 encoded packets of the 20 encoded packets (X'=10) from the transmitter 802 and 6 encoded packets of the 12 encoded packets (Y'=6) from the transmitter 806. The transmitter 802 may determine that it had transmitted 20 encoded packets at the time that the receiver 804 had received 10 encoded packets and determine, via feedback from the transmitter 806, that the transmitter had transmitted 12 encoded packets at the time the receiver 804 had received 6 encoded packets. Accordingly, the transmitter 802 may determine that 10 of the 20 encoded packets were lost in transmission over the Uu direct link connection and 6 of the 12 encoded packets were lost in transmission over the sidelink channel. In some aspects, the receiver 804 may feedback 4 additional encoded packets required for recovering the set of source packets. In some aspects, the transmitter 802 may provide the number of missing encoded packets with four or more additional encoded packets than the receiver 804 is expected to use to determine the source packets. In some aspects, the transmitter 802 may provide the number of missing encoded packets with 20% more encoded packets than the receiver 804 is expected to use to determine the source packets.

By transmitting additional encoded packets in the form of the offset, the transmitter 802 may increase the likelihood that the receiver 804 receives enough encoded packets to decode the source packets and transmits feedback that identifies the number of encoded packets used to determine the source packets and/or the number of missing encoded packets needed to recover the source packets, thus allowing the receiver 804 to decode the encoded packets, as illustrated at 828.

Figure 9:
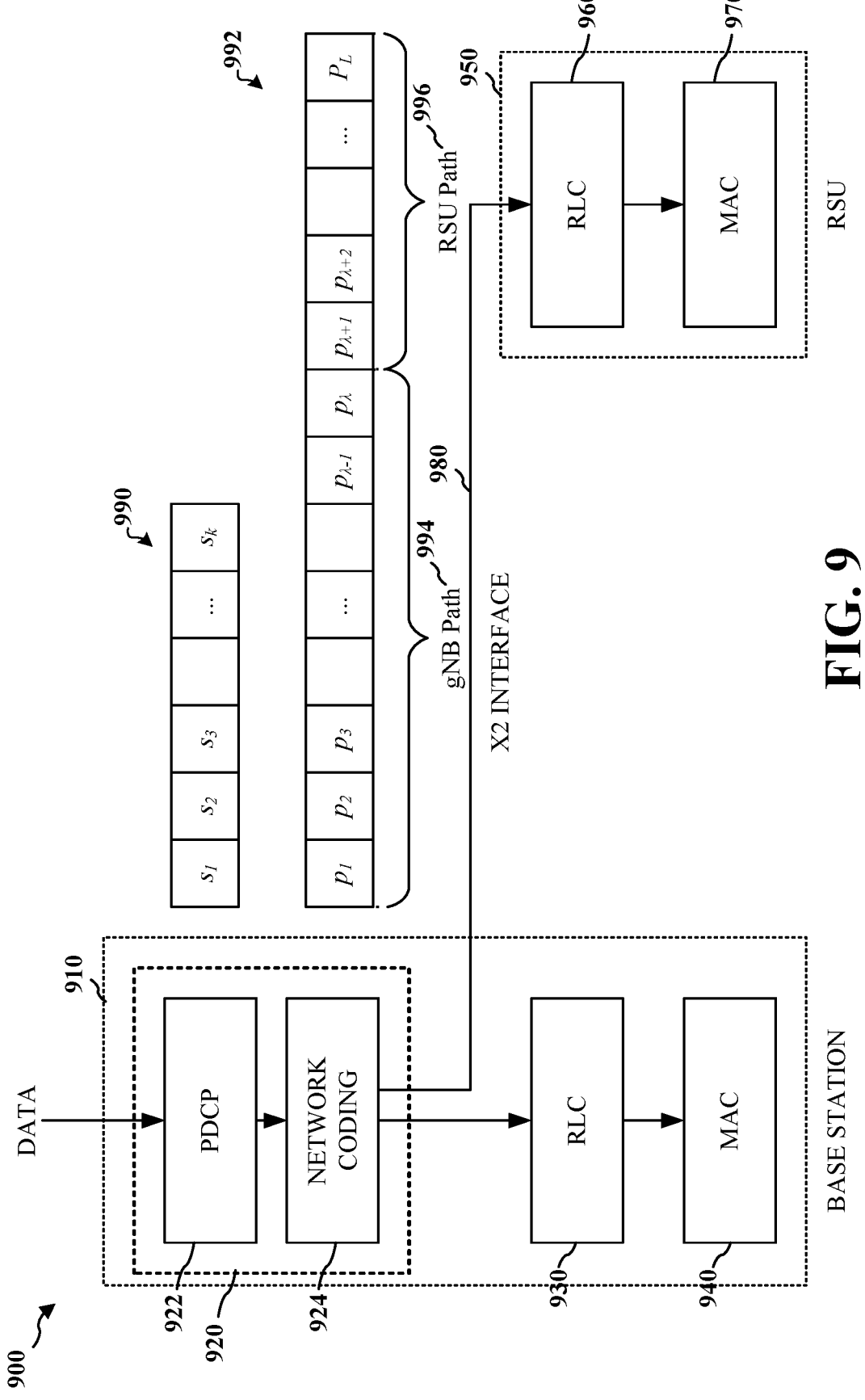
FIG. 9 is a diagram illustrating a network coding system between a base station and a road side unit for dual connectivity, in accordance with one or more of aspects of the present disclosure.

FIG. 9 is a diagram illustrating a network coding system 900 between a base station and a road side unit for dual connectivity, in accordance with one or more of aspects of the present disclosure. The network coding system 900 illustrates a protocol stack architecture in each of a base station 910 and a RSU 950. In a first transmitter path of the base station 910, the protocol stack architecture in the base station 910 includes a PDCP component 920 that includes a PDCP layer 922 and a network coding layer 924, a RLC layer 930 and a MAC layer 940. In some aspects, the network coding layer 924 is a sub-layer of the PDCP layer 922. In a second transmitter path of the RSU 950, the protocol stack architecture in the RSU 950 includes a RLC layer 960 and a MAC layer 970.

As illustrated in FIG. 9, the network coding layer 924 may receive a first number of source packets (e.g., source packets 990) from the PDCP layer 922. In some examples, the first number of source packets is depicted as a dataset of k source packets. The network coding layer 924 may encode the first number of source packets into a second number of encoded packets (e.g., encoded packets 992) with a rateless network code (e.g., Raptor code). As illustrated in FIG. 9, the second number of encoded packets is depicted as having L packets with a first subset of $\lambda$ encoded packets on the gNB path and (L-$\lambda$) encoded packets on the RSU path. Here, $\lambda$ is determined such that $\lambda N_b$ is no greater than a configured threshold, where $\lambda$ is the number of encoded packets on the gNB path and $N_b$ is the size of each encoded packet.

In some aspects, the network coding layer 924 may divide the second number of encoded packets into a first portion (e.g., gNB path portion 994) and a second portion (e.g., RSU path portion 996) when the second number of encoded packets exceeds a preconfigured threshold. The threshold can be pre-determined before transmission. In some aspects, the first portion corresponds to the limited number of encoded packets and the second portion corresponds to a difference between the second number of encoded packets and the limited number of encoded packets.

In other aspects, the network coding layer 924 may pre-divide the second number of encoded packets (e.g., 992) into the first group of encoded packets associated with the base station (e.g., 994) and the second group of encoded packets associated with the RSU (e.g., 996) based on a total size of encoded packets for each of the first group and the second group or a total number of encoded packets for each of the first group and the second group.

The base station 910, at a RRC layer (not shown), may determine a pre-configured threshold that corresponds to a total size of encoded packets for the base station 910. In some aspects, the network coding layer 924 may determine whether the number of encoded packets (e.g., 992) satisfies the pre-configured threshold. When the total size of the encoded packets is above the pre-configured threshold, the encoded packets can be delivered to the RSU path. However, if the total size of encoded packets is below the pre-configured threshold, then there will be no encoded packets transmitted to the RSU path. The network coding layer 924 may send a first portion of the second number of encoded packets to the first RLC layer at the base station 910 (e.g., RLC layer 930) and a second portion of the second number of encoded packets to a second RLC layer at the RSU 950 (e.g., RLC layer 960) over a RAN interface (e.g., X2 interface 980) when the second number of encoded packets exceeds the pre-configured threshold. As illustrated in FIG.

9, the X2 interface is coupled between the network coding layer 924 and the RLC layer 960 of the RSU 950. In some aspects, the base station may send the second number of encoded packets exclusively to the first RLC layer when the second number of encoded packets does not exceed the pre-configured threshold.

In some aspects, the second portion of the second number of encoded packets is sent to the second RLC layer (e.g., RLC layer 960) over the X2 interface 980 by the first network coding layer 924. In some aspects, the first network coding layer 924 is separate from the first RLC layer 930 and the PDCP layer 922 at the base station 910.

In some aspects, the PDCP layer 922 may send an indication request to the first RLC layer 930 and the second RLC layer 960 at the RSU 950 over the X2 interface 980. In some aspects, the indication request indicates a request for the first RLC layer 930 and the second RLC layer 960 to send feedback indicating a filtered data rate or an average rate ratio of their respective paths. In this regard, the network coding layer 924 may divide the encoded packets based on the filtered data rate of each path or based on the average error ratio of each path. By dividing the encoded packets based on the filtered data rate and/or the average error ratio, more encoded packets can be scheduled to the link with better over-the-air conditions.

In some aspects, the PDCP layer 922 may configure a periodic timer. In other aspects, a RRC layer (not shown) of the base station 910 may configure the periodic timer. The PDCP layer 922 may send a configuration indicating the periodic timer to the first RLC layer 930 and the second RLC layer 960 at the RSU 950 over the X2 interface 980. In some aspects, the configuration triggers the first RLC layer 930 and the second RLC layer 960 to automatically send feedback indicating a filtered data rate or average rate ratio of their respective paths based on the periodic timer. In other aspects, the periodic timer may be configured by RRC configuration such that the PDCP layer 922 may receive the RRC configuration containing the preconfigured periodic timer.

The base station 910 may transmit, to a user equipment via the RLC layer 930 and the MAC layer 940, encoded data comprising the second number of encoded packets.

The RSU 950 may receive, at the RLC layer 960, a group of encoded packets (e.g., 996) from the network coding layer 924 at the base station 910 over the X2 interface 980. In some aspects, the RSU 950 may receive, at the RLC layer 960, the group of encoded packets from the network coding layer 924 of the base station 910 over the X2 interface 980. In some aspects, the group of encoded packets is associated with another group of encoded packets (e.g., 994) at the base station 910. The RSU 950 may transmit, to a user equipment, the group of encoded packets (e.g., 996).

Figure 10:
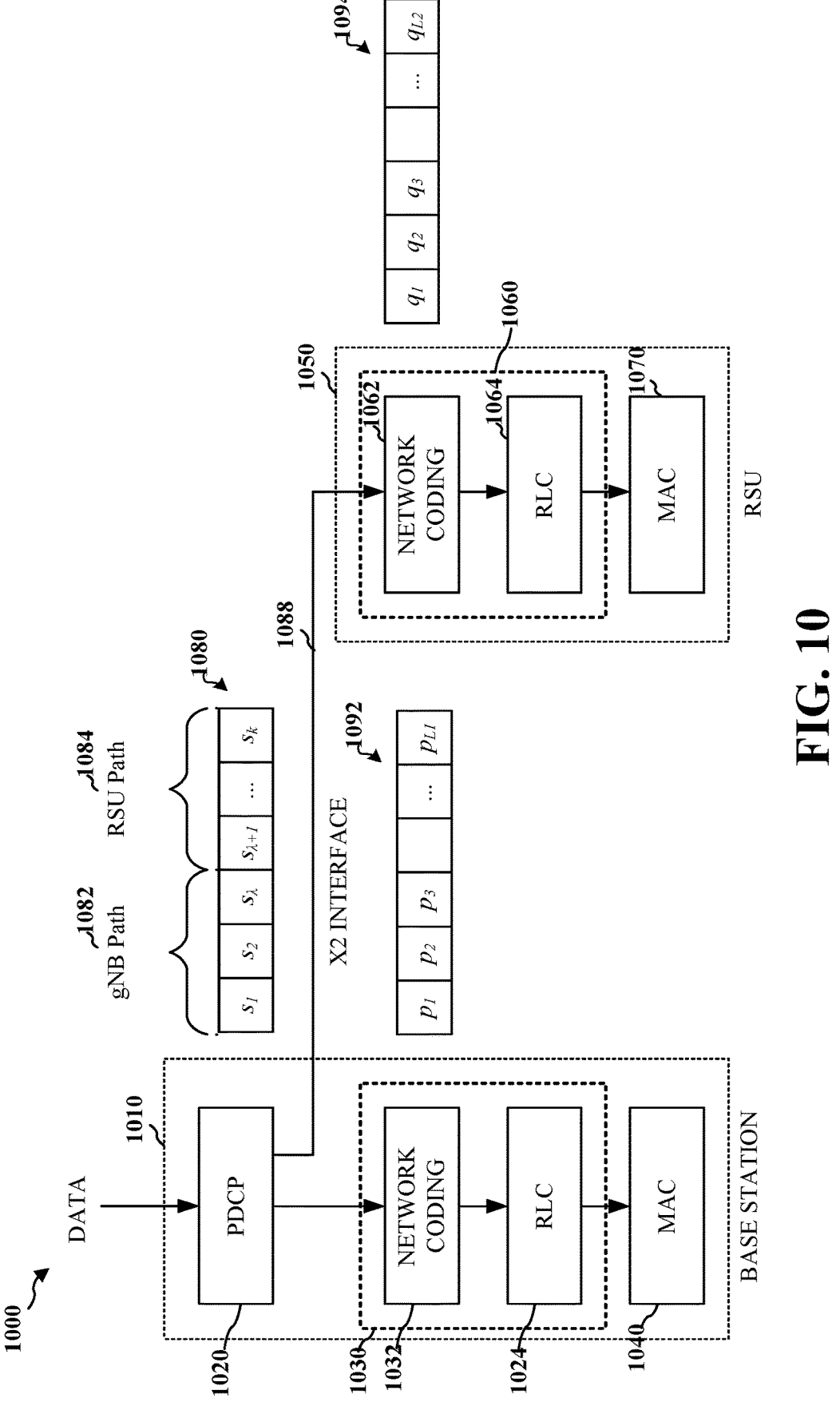
FIG. 10 is a diagram illustrating a network coding system between a base station and a road side unit for dual connectivity, in accordance with one or more of aspects of the present disclosure.

FIG. 10 is a diagram illustrating a network coding system 1000 between a base station and a road side unit for dual connectivity, in accordance with one or more of aspects of the present disclosure. The network coding system 1000 illustrates a protocol stack architecture in each of a base station 1010 and a RSU 1050. In a first transmitter path of the base station 1010, the protocol stack architecture in the base station 1010 includes a PDCP layer 1020, a RLC component 1030 that includes a network coding layer 1032 and a RLC layer 1034, and a MAC layer 1040. In some aspects, the network coding layer 1032 is a sub-layer of the RLC layer 1024. In a second transmitter path of the RSU 1050, the protocol stack architecture in the RSU 1050 includes a RLC component 1060 that includes a network coding layer 1062 and a RLC layer 1064, and a MAC layer 1070. In some aspects, the network coding layer 1062 is a sub-layer of the RLC layer 1064. In some aspects, the network coding layer 1032 is separate from the RLC layer 1024. In some aspects, the network coding layer 1062 is separate from the RLC layer 1064.

As illustrated in FIG. 10, the PDCP layer may receive a first number of source packets (e.g., source packets 1080) from a higher layer. The PDCP layer 1020 may determine whether the first number of source packets (e.g., 1080) exceeds a preconfigured threshold that is based on a limited number of source packets for the base station 1010 and a size of each source packet in the limited number of source packets. When the total size of source packets is above the pre-configured threshold, the source packets can be delivered to the RSU path. As illustrated in FIG. 10, the first number of source packets is depicted as having k packets with a first subset of $\lambda$ encoded packets on the gNB path and (k-$\lambda$) encoded packets on the RSU path. Here, $\lambda$ is determined such that $\lambda N_b$ is no greater than a configured threshold, where $\lambda$ is the number of source packets on the gNB path and $N_b$ is the size of each source packet.

In some aspects, the PDCP layer 1020 may pre-divide the first number of source packets (e.g., 1080) into a first group of source packets associated with the base station 1010 (e.g., 1082) and a second group of source packets associated with the RSU 1050 (e.g., 1084) based on a total size of source packets for each of the first group and the second group or a total number of source packets for each of the first group and the second group. The PDCP layer 1020 may divide the first number of source packets (e.g., 1080) into the first group and the second group when the first number of source packets exceeds the preconfigured threshold. In some aspects, the first group corresponds to the limited number of source packets and the second group corresponds to a difference between the first number of source packets and the limited number of source packets.

The PDCP layer 1020 may send the first group of source packets (e.g., 1082) to the first network coding layer 1032 of the base station 1010. In some aspects, the PDCP layer 1020 may send the first group of source packets (e.g., 1082) to the first network coding layer 1032 at the base station 1010 and the second group of source packets (e.g., 1084) to the second network coding layer 1062 at the RSU 1050 over the X2 interface 1088 when the first number of source packets exceeds the preconfigured threshold. As illustrated in FIG. 10, the X2 interface is coupled between the PDCP layer 1020 and the network coding layer 1062 of the RSU 1050. In some aspects, the PDCP layer 1020 may send the first number of source packets (e.g., 1080) exclusively to the first network coding layer 1032 when the first number of source packets does not exceed the preconfigured threshold.

The network coding layer 1032 may encode the first group of source packets (e.g., 1082) into a first group of encoded packets (e.g., 1092) with a rateless network code (e.g., Raptor code). The network coding layer 1032 may transmit, to a user equipment, encoded data comprising the first group of encoded packets (e.g., 1092) via the RLC layer 1024 and the MAC layer 1040. As illustrated in FIG. 10, the network coding layer 1032 produces $L_1$ encoded packets based on the k source packets on the gNB path.

The RSU 1050 may receive, at the network coding layer 1062 from the base station 1010 over the X2 interface 1088, the second group of source packets 1084. In some aspects, the second group of source packets (e.g., 1084) is associated with the first group of source packets (e.g., 1082) at the base station 1010. The RSU 1050 may encode the second group of source packets (e.g., 1084) into a second group of encoded packets (e.g., 1094) with a rateless network code (e.g., Raptor code) at the network coding layer 1062. As illustrated in FIG. 10, the network coding layer 1062 produces L2 encoded packets based on the (k-k) source packets on the RSU path.

The RLC layer 1064 may receive the second group of encoded packets 1094 from the network coding layer 1062. The RSU 1050 may transmit, to a user equipment via the RLC layer 1064 and the MAC layer 1070, the second group of encoded packets 1094. In some aspects, the second group of encoded packets 1094 is associated with the first group of encoded packets 1092 at the base station 1010.

Figure 11:
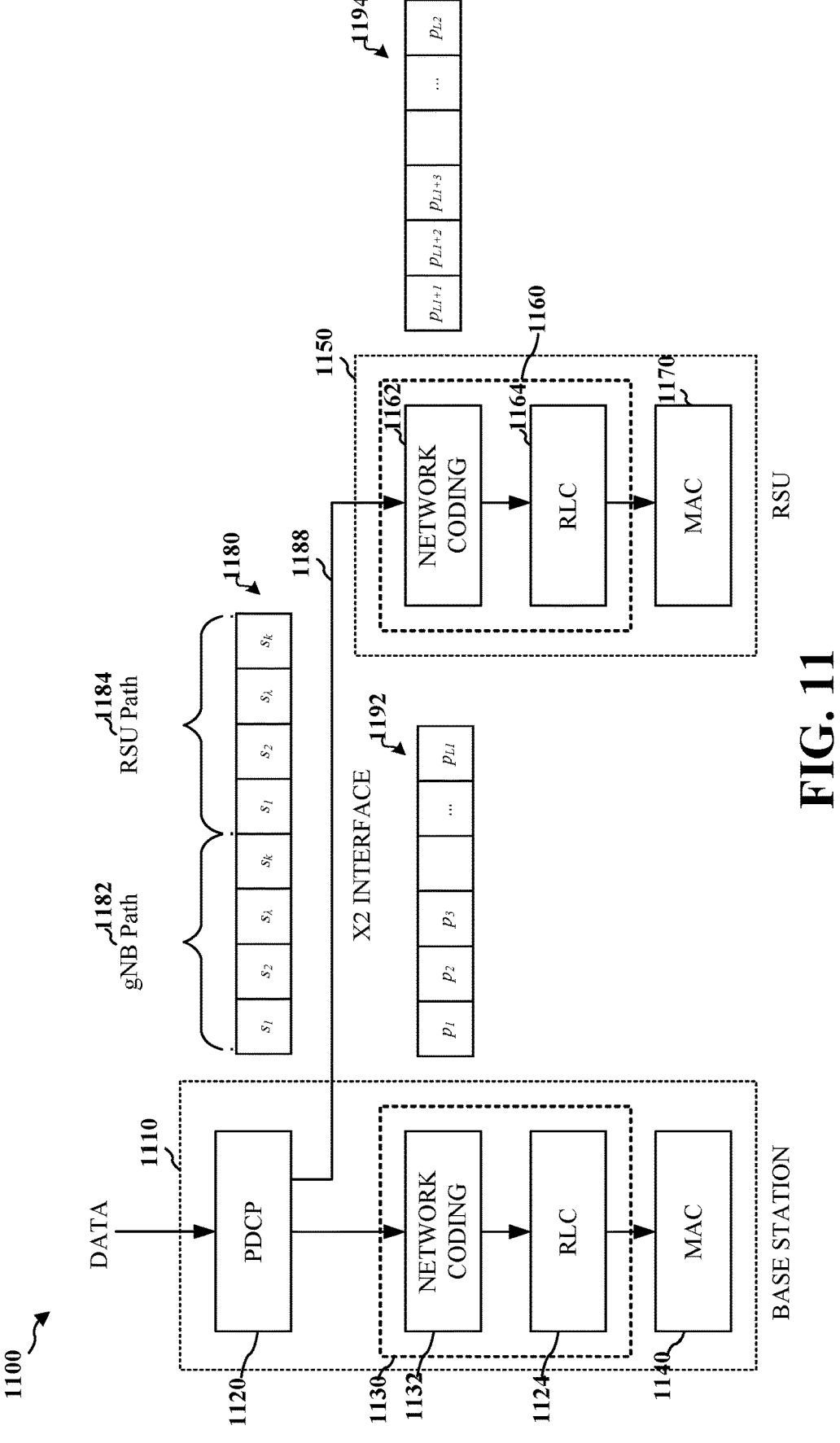
FIG. 11 is a diagram illustrating a network coding system between a base station and a road side unit for dual connectivity, in accordance with one or more of aspects of the present disclosure.

FIG. 11 is a diagram illustrating a network coding system 1100 between a base station and a road side unit for dual connectivity, in accordance with one or more of aspects of the present disclosure. The network coding system 1100 illustrates a protocol stack architecture in each of a base station 1110 and a RSU 1150. In a first transmitter path of the base station 1110, the protocol stack architecture in the base station 1110 includes a PDCP layer 1120, a RLC component 1130 that includes a network coding layer 1132 and a RLC layer 1134, and a MAC layer 1140. In some aspects, the network coding layer 1132 is a sub-layer of the RLC layer 1124. In a second transmitter path of the RSU 1150, the protocol stack architecture in the RSU 1150 includes a RLC component 1160 that includes a network coding layer 1162 and a RLC layer 1164, and a MAC layer 1170. In some aspects, the network coding layer 1162 is a sub-layer of the RLC layer 1164. In some aspects, the network coding layer 1132 is separate from the RLC layer 1124. In some aspects, the network coding layer 1162 is separate from the RLC layer 1164.

As illustrated in FIG. 11, the PDCP layer may receive a first number of source packets (e.g., source packets 1180) from a higher layer. In some aspects, the PDCP layer 1120 may duplicate the first number of source packets (e.g., 1180) such that the PDCP layer produces a first group of source packets associated with the base station 1110 (e.g., 1182) and a second group of source packets associated with the RSU 1150 (e.g., 1184). In some aspects, the second group comprises a duplicate number of source packets as the first group. For example, as illustrated in FIG. 11, each path may have k source packets.

The PDCP layer 1120 may send the first group of source packets (e.g., 1182) to the first network coding layer 1132 of the base station 1110. In some aspects, the PDCP layer 1120 may send the first group of source packets (e.g., 1182) to the first network coding layer 1132 at the base station 1110 and the second group of source packets (e.g., 1184) to the second network coding layer 1162 at the RSU 1150 over the X2 interface 1188.

The network coding layer 1132 may encode the first group of source packets (e.g., 1182) into a first group of encoded packets (e.g., 1192) with a rateless network code (e.g., Raptor code). The network coding layer 1132 may transmit, to a user equipment, encoded data comprising the first group of encoded packets (e.g., 1192) via the RLC layer 1124 and the MAC layer 1140. As illustrated in FIG. 11, the network coding layer 1132 produces $L_1$ encoded packets based on the k source packets on the gNB path.

The RSU 1150 may receive, at the network coding layer 1162 from the base station 1110 over the X2 interface 1188, the second group of source packets 1184. In some aspects, the second group of source packets (e.g., 1184) is associated with the first group of source packets (e.g., 1182) at the base station 1110. The RSU 1150 may encode the second group of source packets (e.g., 1184) into a second group of encoded packets (e.g., 1194) with a rateless network code (e.g., Raptor code) at the network coding layer 1162. As illustrated in FIG. 11, the network coding layer 1162 produces $L_2$ encoded packets based on the k source packets on the RSU path. In this regard, the network coding layer 1162 on the RSU path and the network coding layer 1132 on the base station path utilize the same set of source packets, although the network coding layer 1132 at the base station 1110 and the network coding layer 1162 at the RSU 1150 produce different sets of encoded packets. This is because the network coding layer 1132 at the base station 1110 and the network coding layer 1162 at the RSU 1150 use different columns of the original generator matrix (e.g., 710).

The RLC layer 1164 may receive the second group of encoded packets 1194 from the network coding layer 1162. The RSU 1150 may transmit, to a user equipment via the RLC layer 1164 and the MAC layer 1170, the second group of encoded packets 1194. Although, the second group of encoded packets 1194 and the first group of encoded packets 1192 at the base station 1110 are different sets of encoded packets respectively produced by the RSU 1150 and the base station 1110, both sets are based on the same set of source packets.

FIG. 12 is a diagram illustrating a network coding system 1200 at a user equipment for dual connectivity, in accordance with one or more of aspects of the present disclosure. The network coding system 1200 illustrates a protocol stack architecture having both receiver and transmitter paths with the base station and RSU. In a first receiver path of the protocol stack architecture, the UE includes a MAC layer 1212 and an RLC layer 1222. In a second receiver path of the protocol stack architecture, the UE includes a MAC layer 1214 and an RLC layer 1224. The first receiver path may be interfaced with a base station and the second receiver path may be interfaced with an RSU. The first receiver path and the second receiver path are fed to a network coding layer 1232 and a PDCP layer 1242.

The RLC layer 1222 may pass a first number of encoded packets to the network coding layer 1232. The network coding layer 1232 may recover a second number of source packets from the first number of encoded packets with a rateless network code. In some aspects, the first number of encoded packets has a greater number of packets than the second number of source packets. The network coding layer 1232 may sequence the second number of source packets into an ordered set of source packets. The network coding layer 1232 may send the ordered set of source packets to the PDCP layer 1242.

The network coding layer 1232 may be used to decode the first number of encoded packets into a third number of decoded packets. In some aspects, the UE may recover the source packets by determining whether the third number of decoded packets exceeds the second number of source packets. The network coding layer 1232 may generate feedback based on the determining of whether the third number of decoded packets exceeds the second number of source packets. In some aspects, the feedback indicates whether additional encoded packets are needed to recover at least a portion of the second number of source packets. The UE may transmit, on a transmission path to the base station via the network coding layer 1232, the feedback.

The UE may determine that the second number of source packets is recoverable when the third number of decoded packets exceeds the second number of source packets. In some aspects, the UE may generate a positive acknowledgment message indicating that no encoded packets are missing for recovering the second number of source packets when the third number of decoded packets exceeds the second number of source packets.

The UE may determine that the second number of source packets is recoverable when the third number of decoded packets exceeds the second number of source packets. In some aspects, the UE may generate a negative acknowledgment message indicating that a number of missing encoded packets are needed for recovering the second number of source packets when the third number of decoded packets does not exceed the second number of source packets. The UE may receive, from the base station via the RLC layer 1222 and/or RSU via the RLC layer 1224, an additional number of encoded packets associated with one or more PDCP PDUs that corresponds to the number of missing encoded packets based on the negative acknowledgment message.

The UE may receive, from the base station via the RLC layer 1222, a configuration indicating a preconfigured timer. The UE may generate a status report based on the preconfigured timer, in which the status report includes the feedback. In other aspects, the UE may receive, from the base station via the RLC layer 1222, a trigger signal indicating to the UE to generate the feedback. The UE may generate a status report based on the trigger signal. The UE may transmit, to the base station via the RLC layer 1222, the status report.

The RLC layer 1222 may receive the first number of encoded packets in an out-of-order sequence from the base station via the MAC layer 1212. In some aspects, the RLC layer 1222 may pass the first number of encoded packets in the out-of-order sequence to the network coding layer 1232. In some aspects, the network coding layer 1232 may arrange the second number of source packets from the out-of-order sequence into a consecutively ordered sequence based on a sequence number associated with each of the second number of source packets.

In prior approaches, the RLC layer sequences the packets and sends the packets with consecutive sequence numbers to the PDCP layer. If there are any missing packets, the RLC layer can request an automatic repeat request (ARQ) to the base station. However, for network coding, the source packets can be recovered in the receiver as long as the number of received encoded packets is slightly larger than that of the source packets no matter which packets are received. Therefore, the present disclosure provides for the RLC layer 1222 to send the received encoded packets to the network coding layer 1232 directly without ordering. After the network coding layer 1232 collects enough encoded packets, the network coding layer 1232 can use a network decoding function to recover the source packets $\{s_1, s_2, \ldots, s_k\}$. The network coding layer 1232 can then send the source packets with consecutive sequence numbers, to the PDCP layer 1242.

The UE may receive one or more first encoded packets from the base station over a first logical channel at a first RLC layer (e.g., the RLC layer 1222) via the MAC layer 1212. The UE may receive one or more second encoded packets from the RSU over a second logical channel different than the first logical channel at a second RLC layer (e.g., the RLC layer 1224) via the MAC layer 1214. In some aspects, the first number of encoded packets includes the one or more first encoded packets and the one or more second encoded packets. The network coding layer 1232 may receive the one or more first encoded packets from the first RLC layer 1222 over the first logical channel. The network coding layer may 1232 may receive the one or more second encoded packets from the second RLC layer 1224 over the second logical channel. In some aspects, the network coding layer 1232 may decode the second number of source packets from the one or more first encoded packets and the one or more second encoded packets.

The RLC layer 1222 may receive the first number of encoded packets in an out-of-order sequence from the base station. In some aspects, the RLC layer 1222 may send the first number of encoded packets in the out-of-order sequence to the network coding layer 1232. In some aspects, the network coding layer 1232 may sequence by arranging the second number of source packets from the out-of-order sequence into a consecutively ordered sequence based on a sequence number associated with each of the second number of source packets.

FIG. 13 is a flowchart of a process 1300 of wireless communication, in accordance with one or more of aspects of the present disclosure. The process 1300 may be performed by a base station (e.g., the BS 102, 180, 410, 520; transmitter 802; BS 910, 1010, 1110; the apparatus 1802, which may include memory, a cellular baseband processor 1004, and one or more components configured to perform the 1300). As illustrated, the process 1300 includes a number of enumerated steps, but embodiments of the process 1300 may include additional steps before, after, and in between the enumerated steps. In some embodiments, one or more of the enumerated steps may be omitted or performed in a different order. Optional aspects are illustrated with a dashed line. The process 1300 enables a wireless communication device to facilitate dual connectivity with Uu direct link connections and sidelink-based relays between UEs and a core network.

At 1302, the base station may receive a first number of source packets from a packet data convergence protocol (PDCP) layer. The base station can receive the first number of source packets, e.g., by the reception component 1830 of the apparatus 1802 through coordination with the protocol stack component 1848 of the apparatus 1802 in FIG. 18.

At 1304, the base station may encode the first number of source packets into a second number of encoded packets with a rateless network code at a first network coding layer. The base station encodes the first number of source packets, e.g., by the encoding component 1842 of the apparatus 1802 through coordination with the protocol stack component 1848 of the apparatus 1802 in FIG. 18.

At 1306, the base station divide the second number of encoded packets into the first portion and the second portion when the second number of encoded packets exceeds the preconfigured threshold. In some aspects, the first portion corresponds to the limited number of encoded packets and the second portion corresponds to a difference between the second number of encoded packets and the limited number of encoded packets. The base station divides the second number of encoded packets, e.g., by the flow control component 1840 of the apparatus 1802 through coordination with the protocol stack component 1848 in FIG. 18. In other aspects, the base station may divide the second number of encoded packets into the first group of encoded packets associated with the base station and the second group of encoded packets associated with the RSU based on a total size of encoded packets for each of the first group and the second group or a total number of encoded packets for each of the first group and the second group.

At 1308, the base station may determine whether the number of encoded packets exceeds the number of source packets. If it is determined that the number of encoded packets exceeds the number of source packets, then the process 1300 proceeds to block 1310. Otherwise, the process 1300 proceeds to block 1312.

At 1310, the base station may send a first portion of the second number of encoded packets to the first RLC layer at the base station and a second portion of the second number of encoded packets to a second RLC layer at a RSU over a RAN interface when the second number of encoded packets exceeds the first number of source packets.

At 1312, the base station may send the second number of encoded packets from the first network coding layer to a first RLC layer. The UE can send the second number of encoded packets internally, e.g., by the encoding component 1842 of the apparatus 1802 through coordination with the protocol stack component 1848 of the apparatus 1802 in FIG. 18. In some aspects, the base station may send the second number of encoded packets exclusively to the first RLC layer when the second number of encoded packets does not exceed the first number of source packets.

At 1314, the base station may transmit, to a user equipment, encoded data comprising the second number of encoded packets. The base station can transmit the encoded data, e.g., by the transmission component 1834 of the apparatus 1802 through coordination with the protocol stack component 1848 of the apparatus 1802 in FIG. 18.

In some aspects, the base station may determine, at a RRC layer, a pre-configured threshold that corresponds to a total size of encoded packets for the base station. In some aspects, the base station may determine whether the second number of encoded packets satisfies the pre-configured threshold, e.g., by the flow control component 1840 of the apparatus 1802 through coordination with the protocol stack component 1848 of the apparatus 1802 in FIG. 18. In some aspects, the base station may send a first portion of the second number of encoded packets to the first RLC layer at the base station and a second portion of the second number of encoded packets to a second RLC layer at a RSU over a RAN interface when the second number of encoded packets satisfies the pre-configured threshold, e.g., by the transmission component 1834 of the apparatus 1802 through coordination with the protocol stack component 1848 of the apparatus 1802 in FIG. 18. In other aspects, the base station may send the second number of encoded packets exclusively to the first RLC layer when the second number of encoded packets does not satisfy the pre-configured threshold, e.g., by the transmission component 1834 of the apparatus 1802 through coordination with the protocol stack component 1848 of the apparatus 1802 in FIG. 18.

Figure 18:
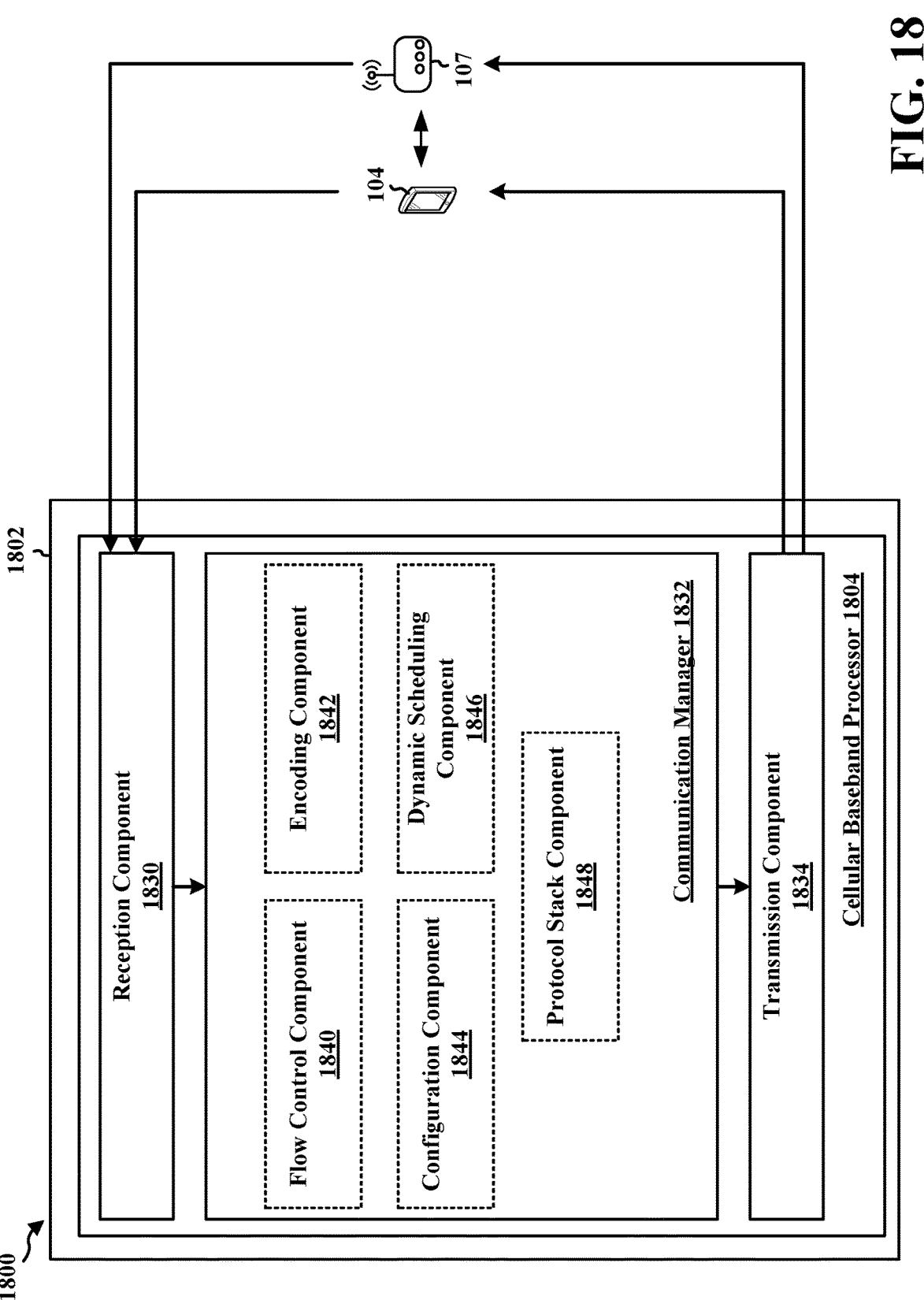
FIG. 18 is a diagram illustrating an example of a hardware implementation for an example apparatus.

In some aspects, the base station may determine whether the second number of encoded packets exceeds the preconfigured threshold that is based on a limited number of encoded packets for the base station and a size of each encoded packet in the limited number of encoded packets, e.g., by the flow control component 1840 of the apparatus 1802 through coordination with the protocol stack component 1848 of the apparatus 1802 and the configuration component 1844 of the apparatus 1802 in FIG. 18. The base station may divide the second number of encoded packets into the first portion and the second portion when the second number of encoded packets exceeds the preconfigured threshold, e.g., by the flow control component 1840 of the apparatus 1802 through coordination with the protocol stack component 1848 of the apparatus 1802 in FIG. 18. In some aspects, the first portion corresponds to the limited number of encoded packets and the second portion corresponds to a difference between the second number of encoded packets and the limited number of encoded packets. In some aspects, the second portion of the second number of encoded packets is sent to the second RLC layer over the RAN interface by the first network coding layer. In some aspects, the first network coding layer is a sub-layer of the PDCP layer at the base station.

In some aspects, the second portion of the second number of encoded packets is sent to a second network coding layer of the second RLC layer over the RAN interface by the PDCP layer. In some aspects, the first network coding layer is a sub-layer of the first RLC layer at the base station and the second network coding layer is a sub-layer of the second RLC layer at the RSU.

In some aspects, the second portion of the second number of encoded packets is sent to the second RLC layer over the RAN interface by the first network coding layer. In some aspects, the first network coding layer is separate from the first RLC layer and the PDCP layer at the base station.

In some aspects, the second portion of the second number of encoded packets is sent to the second RLC layer via a second network coding layer over the RAN interface by the PDCP layer. In some aspects, the first network coding layer is separate from the first RLC layer and the PDCP layer at the base station and the second network coding layer is separate from the second RLC layer at the RSU.

The base station may divide the second number of encoded packets into a first group of encoded packets associated with the base station and a second group of encoded packets associated with a RSU based on a total size of encoded packets for each of the first group and the second group or a total number of encoded packets for each of the first group and the second group, e.g., by the flow control component 1840 of the apparatus 1802 through coordination with the protocol stack component 1848 of the apparatus 1802 in FIG. 18. In some aspects, the base station may send the first group of encoded packets associated with the base station to the first RLC layer at the base station and the second group of encoded packets to a second RLC layer at the RSU over a RAN interface, e.g., by the flow control component 1840 of the apparatus 1802 through coordination with the protocol stack component 1848 of the apparatus 1802 and the transmission component 1834 of the apparatus 1802 in FIG. 18. In some aspects, the first network coding layer is a sub-layer of the PDCP layer at the base station.

In some aspects, the base station may send an indication request from the PDCP layer to the first RLC layer at the base station and the second RLC layer at the RSU over the RAN interface, e.g., by the dynamic scheduling component 1846 of the apparatus 1802 through coordination with the protocol stack component 1848 of the apparatus 1802 in FIG. 18. In some aspects, the indication request indicates a request for the first RLC layer and the second RLC layer to send feedback indicating a filtered data rate or an average rate ratio of their respective paths.

In some aspects, the base station may configure a periodic timer at the PDCP layer, e.g., by the configuration component 1844 of the apparatus 1802 through coordination with the protocol stack component 1848 of the apparatus 1802 in FIG. 18. The base station may sending a configuration indicating the periodic timer to the first RLC layer at the base station and the second RLC layer at the RSU over the RAN interface, e.g., by the configuration component 1844 of the apparatus 1802 through coordination with the protocol stack component 1848 of the apparatus 1802 in FIG. 18. In some aspects, the configuration triggers the first RLC layer and the second RLC layer to automatically send feedback indicating a filtered data rate or average rate ratio of their respective paths based on the periodic timer.

Figure 14:
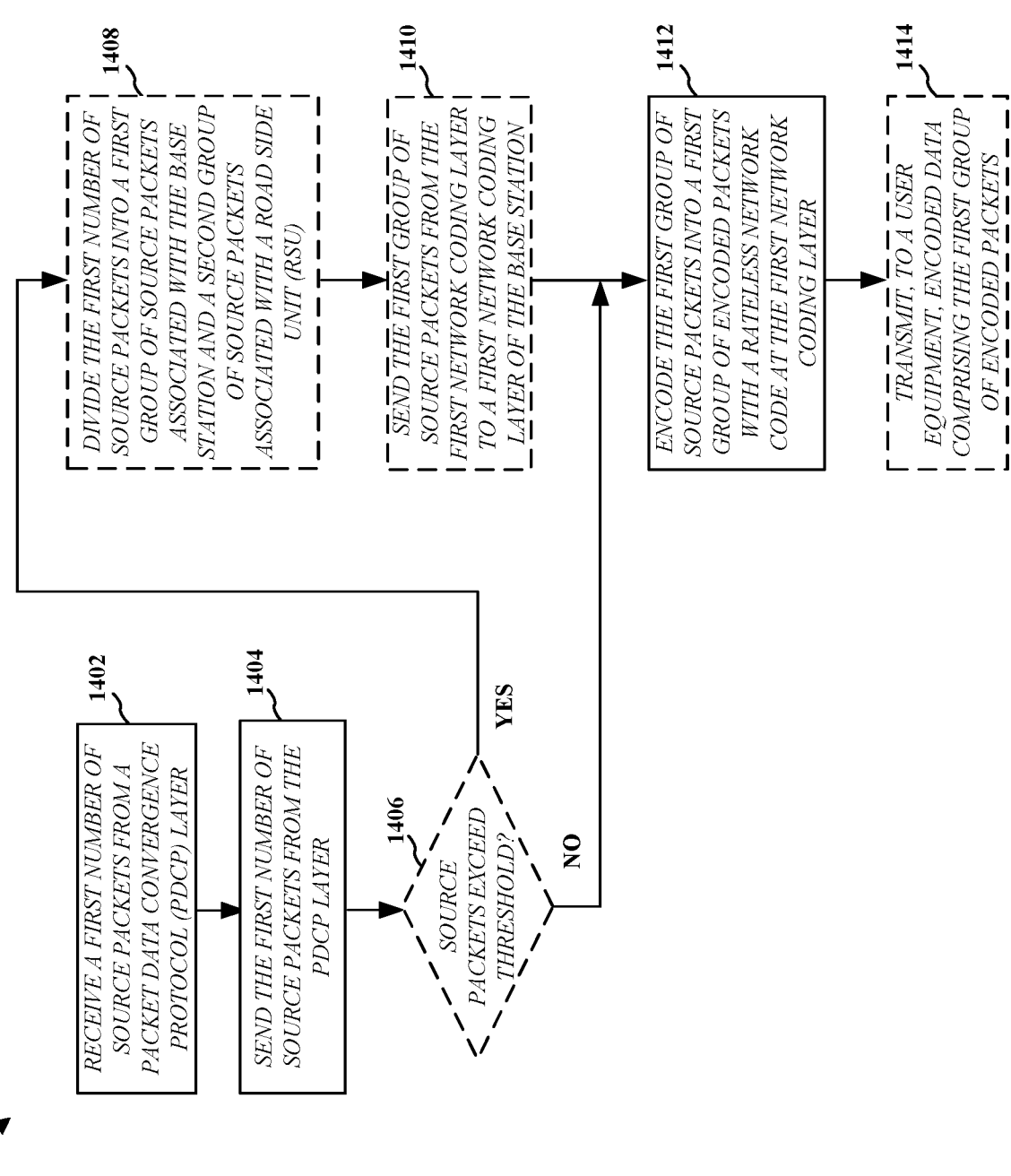
FIG. 14 is a flowchart of a process of wireless communication at a base station, in accordance with one or more of aspects of the present disclosure.

FIG. 14 is a flowchart of a process 1400 of wireless communication, in accordance with one or more of aspects of the present disclosure. The process 1400 may be performed by a base station (e.g., the BS 102, 180, 410, 520; transmitter 802; BS 910, 1010, 1110; the apparatus 1802, which may include memory, a cellular baseband processor 1004, and one or more components configured to perform the 1400). As illustrated, the process 1400 includes a number of enumerated steps, but embodiments of the process 1400 may include additional steps before, after, and in between the enumerated steps. In some embodiments, one or more of the enumerated steps may be omitted or performed in a different order. Optional aspects are illustrated with a dashed line. The process 1400 enables a wireless communication device to facilitate dual connectivity with Uu direct link connections and sidelink-based relays between UEs and a core network.

At 1402, the base station may receive a first number of source packets at a PDCP layer from a higher layer. The UE receives the source packets, e.g., by the protocol stack component 1848 of the apparatus 1802 in FIG. 18.

At 1404, the base station may send the first number of source packets from the PDCP layer to a first network coding layer of the base station. The base station passes the source packets to the network coding layer, e.g., by the protocol stack component 1848 of the apparatus 1802 through coordination with the flow control component 1840 of the apparatus 1802 in FIG. 18.

At 1406, the base station may determine whether the first number of source packets exceeds a preconfigured threshold that is based on a limited number of source packets for the base station and a size of each source packet in the limited number of source packets. The base station makes the comparison to the preconfigured threshold, e.g., by the flow control component 1840 of the apparatus 1802 through coordination with the protocol stack component 1848 of the apparatus 1802 in FIG. 18.

At 1408, the base station may divide the first number of source packets into a first group of source packets associated with the base station and a second group of source packets associated with a RSU based on a total size of source packets for each of the first group and the second group or a total number of source packets for each of the first group and the second group. The base station may divide the source packets, e.g., by the protocol stack component 1848 of the apparatus 1802 through coordination with the flow control component 1840 of the apparatus 1802 in FIG. 18.

At 1410, the base station may send the first number of source packets from the PDCP layer to a first network coding layer of the base station. The base station passes the source packets to the network coding layer, e.g., by the flow control component 1840 of the apparatus 1802 through coordination with the protocol stack component 1848 of the apparatus 1802 in FIG. 18.

At 1412, the base station may encode the first number of source packets into a second number of encoded packets with a rateless network code at the first network coding layer. The base station encodes the source packets, e.g., by the encoding component 1842 of the apparatus 1802 through coordination with the protocol stack component 1848 of the apparatus 1802 in FIG. 18.

At 1414, the base station may transmit, to a user equipment, encoded data comprising the second number of encoded packets. The base station transmits the encoded packets, e.g., by the transmission component 1834 of the apparatus 1802 through coordination with the protocol stack component 1848 of the apparatus 1802 in FIG. 18.

In some aspects, the base station may determine whether the first number of source packets exceeds a preconfigured threshold that is based on a limited number of source packets for the base station and a size of each source packet in the limited number of source packets, e.g., by the protocol stack component 1848 of the apparatus 1802 through coordination with the flow control component 1840 of the apparatus 1802 in FIG. 18. In some aspects, the base station may send a first portion of the first number of source packets to the first network coding layer at the base station and a second portion of the first number of source packets to a second network coding layer at a RSU over a RAN interface when the first number of source packets exceeds the preconfigured threshold, e.g., by the protocol stack component 1848 of the apparatus 1802 through coordination with the flow control component 1840 of the apparatus 1802 in FIG. 18. In some aspects, the base station may send the first number of source packets exclusively to the first network coding layer when the first number of source packets does not exceed the preconfigured threshold, e.g., by the protocol stack component 1848 of the apparatus 1802 through coordination with the flow control component 1840 of the apparatus 1802 in FIG. 18. The base station may divide the first number of source packets into the first portion and the second portion when the first number of source packets exceeds the preconfigured threshold, e.g., by the protocol stack component 1848 of the apparatus 1802 through coordination with the flow control component 1840 of the apparatus 1802 in FIG. 18. In some aspects, the first portion corresponds to the limited number of source packets and the second portion corresponds to a difference between the first number of source packets and the limited number of source packets. In some aspects, the second portion of the first number of source packets is sent to the second network coding layer over the RAN interface by the PDCP layer. In some aspects, the first network coding layer is a sub-layer of a first RLC layer at the base station and the second network coding layer is a sub-layer of a second RLC layer at the RSU.

In some aspects, the base station may send the first number of source packets with a duplicate number of source packets to each of the first network coding layer at the base station and to a second network coding layer at a RSU over a RAN interface, e.g., by the protocol stack component 1848 of the apparatus 1802 through coordination with the flow control component 1840 of the apparatus 1802 in FIG. 18. In some aspects, the second portion of the first number of source packets is sent to the second network coding layer over the RAN interface by the PDCP layer. In some aspects, the first network coding layer is a sub-layer of a first RLC layer at the base station and the second network coding layer is a sub-layer of a second RLC layer at the RSU. In other aspects, the second number of encoded packets at the base station is non-overlapping with a number of encoded packets associated with the first number of source packets at the RSU based on the first number of source packets having been sent with the duplicate number of source packets to each of the first network coding layer and the second network coding layer.

The base station may divide the first number of source packets into a first group of source packets associated with the base station and a second group of source packets associated with a RSU based on a total size of source packets for each of the first group and the second group or a total number of source packets for each of the first group and the second group, e.g., by the protocol stack component 1848 of the apparatus 1802 through coordination with the flow control component 1840 of the apparatus 1802 in FIG. 18.

In some aspects, the base station may send the first group of source packets associated with the base station to the first network coding layer at the base station, e.g., by the flow control component 1840 of the apparatus 1802 through coordination with the protocol stack component 1848 of the apparatus 1802 in FIG. 18, and transmit the second group of source packets to a second network coding layer at the RSU over a RAN interface, e.g., by the flow control component 1840 of the apparatus 1802 through coordination with the protocol stack component 1848 of the apparatus 1802 and the transmission component 1834 of the apparatus 1802 in FIG. 18. In some aspects, the first network coding layer is a sub-layer of a first RLC layer at the base station and the second network coding layer is a sub-layer of a second RLC layer at the RSU.

FIG. 15 is a flowchart of a process 1500 of wireless communication, in accordance with one or more of aspects of the present disclosure. The process 1500 may be performed by a road side unit (e.g., the RSU 107, 530, 540; transmitter 806; RSU 950, 1050, 1150; the apparatus 1902, which may include memory, a cellular baseband processor 904, and one or more components configured to perform the 1500). As illustrated, the process 1500 includes a number of enumerated steps, but embodiments of the process 1500 may include additional steps before, after, and in between the enumerated steps. In some embodiments, one or more of the enumerated steps may be omitted or performed in a different order. Optional aspects are illustrated with a dashed line.

At 1502, the RSU may receive, at a network coding layer from a PDCP layer of the base station over a RAN interface, a first group of source packets. The RSU receives the source packets, e.g., by the protocol stack component 1944 of the apparatus 1902 through coordination with the reception component 1930 of the apparatus 1902 in FIG. 19. In some aspects, the first group of source packets is associated with a second group of source packets at the base station. In some aspects, the RSU may receive a first group of encoded packets from a network coding layer of the base station. In some aspects, the network coding layer is a sub-layer of a PDCP layer at the base station.

At 1504, the RSU may encode the first group of source packets into the first group of encoded packets with a rateless network code at the network coding layer. The RSU encodes the source packets, e.g., by the protocol stack component 1944 of the apparatus 1902 in FIG. 19. In some aspects, the network coding layer is a sub-layer of the RLC layer at the RSU.

At 1506, the RSU may receive, at the RLC layer, a first group of encoded packets from a network coding layer. The RSU receives the encoded packets, e.g., by the protocol stack component 1944 of the apparatus 1902 in FIG. 19. In some aspects, the RSU may receive, at the RLC layer, a first group of encoded packets from a network coding layer of the base station over a RAN interface. The RSU receives the encoded packets, e.g., by the protocol stack component 1944 of the apparatus 1902 through coordination with the reception component 1930 of the apparatus 1902 in FIG. 19. In some aspects, the network coding layer is a sub-layer of a PDCP layer at the base station.

At 1508, the RSU may send the first group of encoded packets from the network coding layer to the RLC layer. The RSU sends the encoded packets, e.g., by the protocol stack component 1944 of the apparatus 1902 in FIG. 19. In some aspects, the network coding layer is separate from the RLC layer.

At 1510, the RSU may transmit, to a user equipment, the first group of encoded packets. The RSU transmits the encoded packets, e.g., by the transmission component 1934 of the apparatus 1902 through coordination with the forward component 1940 of the apparatus 1902 and the protocol stack component 1944 of the apparatus 1902 in FIG. 19. In some aspects, the first group of encoded packets is associated with a second group of encoded packets at a base station.

FIG. 16 is a flowchart of a process 1600 of wireless communication, in accordance with one or more of aspects of the present disclosure. The process 1600 may be performed by a UE (e.g., the UE 104, 450, 502, 504, 506; receiver 804; UE 1210; the apparatus 1702, which may include memory, a cellular baseband processor 904, and one or more components configured to perform the 1600). As illustrated, the process 1600 includes a number of enumerated steps, but embodiments of the process 1600 may include additional steps before, after, and in between the enumerated steps. In some embodiments, one or more of the enumerated steps may be omitted or performed in a different order. Optional aspects are illustrated with a dashed line. The process 1600 enables a wireless communication device to facilitate dual connectivity with Uu direct link connections and sidelink-based relays between UEs and a core network.

At 1602, the UE may send a first number of encoded packets from a RLC layer to a network coding layer. The UE sends the encoded packets, e.g., by the combination component 1740 of the apparatus 1702 through coordination with the protocol stack component 1746 of the apparatus 1702 in FIG. 17.

At 1604, the UE may generate a status report based on the preconfigured timer, the status report comprising the feedback. The UE generates the status report, e.g., by the feedback component 1744 of the apparatus 1702 in FIG. 17. In some aspects, the UE may receive, from the base station, a configuration indicating a preconfigured timer, e.g., by the reception component 1730 through coordination with the combination component 1740 of the apparatus 1702 and the protocol stack component 1746 of the apparatus 1702 in FIG. 17. The UE may generate a status report based on the preconfigured timer. In some aspects, the UE may receive, from the base station, a trigger signal indicating to the UE to generate the feedback, e.g., by the reception component 1730 through coordination with the combination component 1740 of the apparatus 1702 and the protocol stack component 1746 of the apparatus 1702 in FIG. 17. The UE may generate the status report based on the trigger signal.

At 1606, the UE may transmit, to the base station, the status report. The UE transmits the status report, e.g., by the feedback component 1744 of the apparatus 1702 through coordination with the transmission component 1734 of the apparatus 1702 in FIG. 17. In some aspects, the UE may generate and transmit, to the base station, a positive acknowledgment message indicating that no encoded packets are missing for recovering the second number of source packets when the second number of source packets is recoverable, e.g., by the feedback component 1744 of the apparatus 1702 through coordination with the transmission component 1734 of the apparatus 1702 in FIG. 17. In some aspects, the UE may generate and transmit, to the base station, a negative acknowledgment message indicating that a number of missing encoded packets are needed for recovering the second number of source packets when the second number of source packets is not recoverable, e.g., by the feedback component 1744 of the apparatus 1702 through coordination with the transmission component 1734 of the apparatus 1702 in FIG. 17. In some aspects, the UE may receive an additional number of encoded packets associated with one or more PDCP PDUs that corresponds to the number of missing encoded packets based on the negative acknowledgment message, e.g., by the reception component 1730 through coordination with the combination component 1740 of the apparatus 1702 and the protocol stack component 1746 of the apparatus 1702 in FIG. 17.

At 1608, the UE may recover a second number of source packets from the first number of encoded packets with a rateless network code at the network coding layer. The UE recovers the source packets, e.g., by the decoding component 1742 of the apparatus 1702 in FIG. 17. In some aspects, the first number of encoded packets having a greater number of packets than the second number of source packets. In some aspects, the UE may recover the source packets by determining whether the first number of encoded packets exceeds the second number of source packets, e.g., by the combination component 1740 of the apparatus 1702 through coordination with the protocol stack component 1746 of the apparatus 1702 in FIG. 17. The UE may decode the first number of encoded packets into a third number of decoded packets, and determine whether the third number of decoded packets exceeds the second number of source packets. In this regard, the UE may generate feedback at the network coding layer based on the determining of whether the third number of decoded packets exceeds the second number of source packets, e.g., by the feedback component 1744 of the apparatus 1702 in FIG. 17. In some aspects, the feedback indicates whether additional encoded packets are needed to recover at least a portion of the second number of source packets. In some aspects, the UE may decode the first number of encoded packets into the second number of source packets when the third number of decoded packets exceeds the second number of source packets, e.g., by the decoding component 1742 of the apparatus 1702 in FIG. 17.

At 1610, the UE may sequence the second number of source packets into an ordered set of source packets at the network coding layer. The UE sequences the source packets, e.g., by the decoding component 1742 of the apparatus 1702 through coordination with the protocol stack component 1746 of the apparatus 1702 in FIG. 17. In some aspects, the recovering and the sequencing are performed at the RLC layer via the network coding layer, in which the network coding layer is a sublayer of the RLC layer.

At 1612, the UE may send the ordered set of source packets from the network coding layer to a PDCP layer. The sends the ordered source packets, e.g., by the decoding component 1742 of the apparatus 1702 through coordination with the protocol stack component 1746 of the apparatus 1702 in FIG. 17. In some aspects, the recovering and the sequencing are performed at the PDCP layer via the network coding layer, in which the network coding layer is a sublayer of the PDCP layer. In some aspects, the network coding layer is separate from the RLC layer and the PDCP layer.

Figure 17:
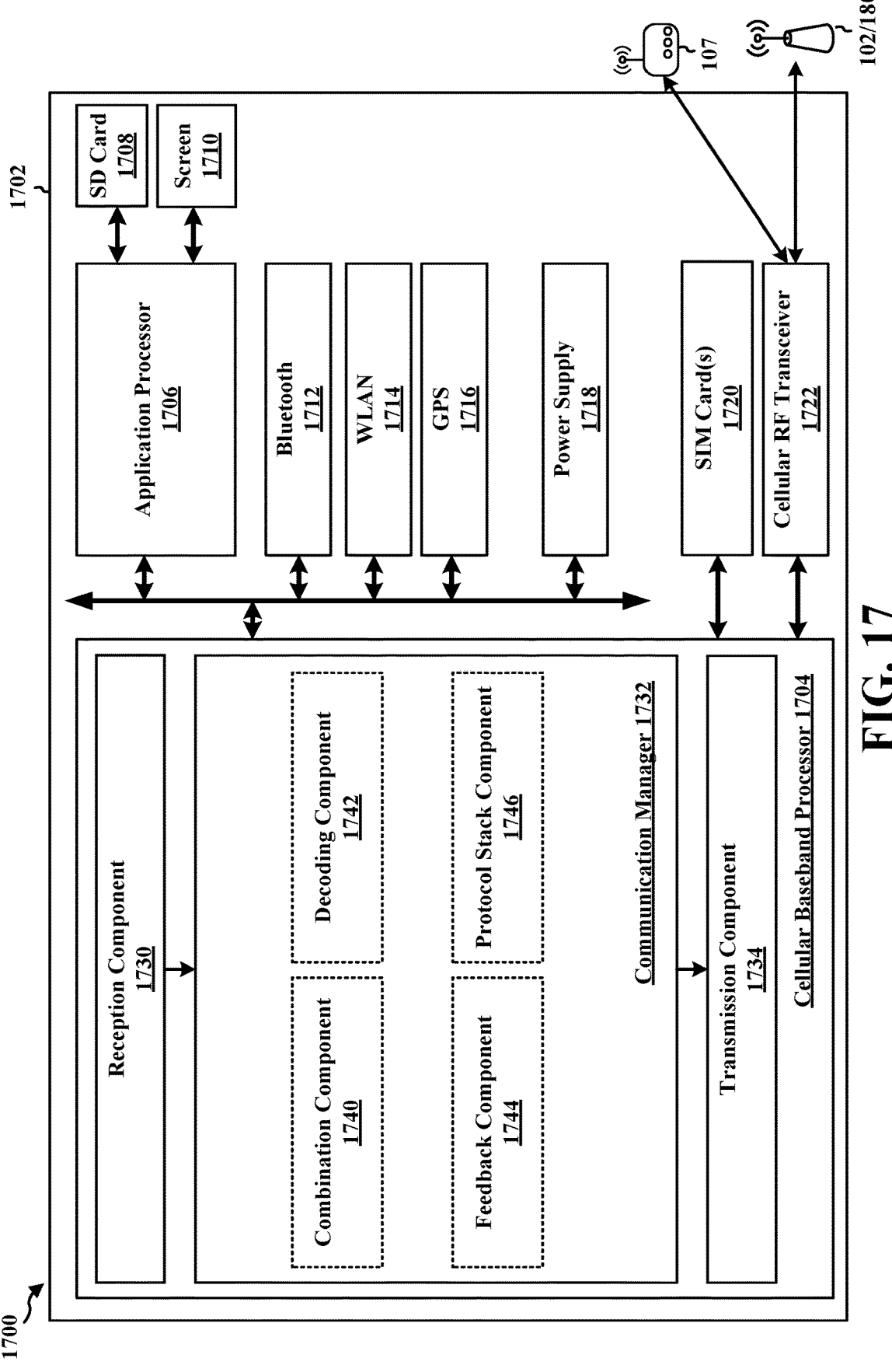
FIG. 17 is a diagram illustrating an example of a hardware implementation for an example apparatus.

In some aspects, the UE may receive the first number of encoded packets in an out-of-order sequence from a base station at the RLC layer, e.g., by the combination component 1740 of the apparatus 1702 in FIG. 17. In some aspects, the UE may send the first number of encoded packets in the out-of-order sequence to the network coding layer, e.g., by the combination component 1740 of the apparatus 1702 through coordination with the protocol stack component 1746 of the apparatus 1702 in FIG. 17. In some aspects, the UE may arrange the second number of source packets from the out-of-order sequence into a consecutively ordered sequence at the network coding layer based on a sequence number associated with each of the second number of source packets, e.g., by the decoding component 1742 of the apparatus 1702 in FIG. 17.

In some aspects, the UE may receive one or more first encoded packets from a base station over a first logical channel at a first RLC layer, e.g., by the combination component 1740 of the apparatus 1702 through coordination with the protocol stack component 1746 of the apparatus 1702 in FIG. 17. In some aspects, the UE may receive one or more second encoded packets from a RSU over a second logical channel different than the first logical channel at a second RLC layer, e.g., by the combination component 1740 of the apparatus 1702 through coordination with the protocol stack component 1746 of the apparatus 1702 in FIG. 17. In some aspects, the UE may receive the one or more first encoded packets from the first RLC layer over the first logical channel at the network coding layer, e.g., by the combination component 1740 of the apparatus 1702 through coordination with the protocol stack component 1746 of the apparatus 1702 in FIG. 17. In some aspects, the UE may receive the one or more second encoded packets from the second RLC layer over the second logical channel at the network coding layer, e.g., by the combination component 1740 of the apparatus 1702 through coordination with the protocol stack component 1746 of the apparatus 1702 in FIG. 17. In some aspects, the UE may recover the source packets by decoding the second number of source packets from the one or more first encoded packets and the one or more second encoded packets, e.g., by the decoding component 1742 of the apparatus 1702 through coordination with the protocol stack component 1746 of the apparatus 1702 in FIG. 17.

In some aspects, the UE may receive the first number of encoded packets in an out-of-order sequence from a base station at the RLC layer, e.g., by the combination component 1740 of the apparatus 1702 through coordination with the protocol stack component 1746 of the apparatus 1702 in FIG. 17. In some aspects, the UE may send the first number of encoded packets in the out-of-order sequence to the network coding layer, e.g., by the combination component 1740 of the apparatus 1702 through coordination with the protocol stack component 1746 of the apparatus 1702 in FIG. 17. In some aspects, the UE may sequence the source packets by arranging the second number of source packets from the out-of-order sequence into a consecutively ordered sequence at the network coding layer based on a sequence number associated with each of the second number of source packets, e.g., by the decoding component 1742 of the apparatus 1702 through coordination with the protocol stack component 1746 of the apparatus 1702 in FIG. 17.

FIG. 17 is a diagram 1700 illustrating an example of a hardware implementation for an apparatus 1702. The apparatus 1702 may be a UE or other wireless device that communicates based on Uu direct link and/or sidelink. The apparatus 1702 includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with other wireless devices, such as a UE 104 and/or base station 102/180. The cellular baseband processor 1704 may include a computer-readable medium/memory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the device 450 and may include the memory 460 and/or at least one of the TX processor 468, the RX processor 456, and the controller/processor 459. In one configuration, the apparatus 1702 may be a modem chip and include just the baseband processor 1704, and in another configuration, the apparatus 1702 may be the entire wireless device (e.g., see the device 450 of FIG. 4) and include the additional modules of the apparatus 1702.

The communication manager 1732 includes a combination component 1740, a decoding component 1742, a feedback component 1744 and/or a protocol stack component 1746 configured to perform the aspects described in connection with a process in FIG. 16. The apparatus is illustrated as including components to perform the process of FIG. 16, because the wireless device may operate as a transmitting device at times and may operate as a receiving device at other times.

The apparatus 1702 may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1702 may further include means for sending a first number of encoded packets from a RLC layer to a network coding layer. The apparatus 1702 also may include means for recovering a second number of source packets from the first number of encoded packets with a rateless network code at the network coding layer. In some aspects, the first number of encoded packets has a greater number of packets than the second number of source packets. The apparatus 1702 also may include means for sequencing the second number of source packets into an ordered set of source packets at the network coding layer. The apparatus 1702 also may include means for sending the ordered set of source packets from the network coding layer to a PDCP layer.

In some aspects, the means for recovering may be configured to decode the first number of encoded packets into a third number of decoded packets. The apparatus 1702 may determine whether the third number of decoded packets exceeds the second number of source packets. The apparatus 1702 may further include means for generating feedback at the network coding layer based on the determining of whether the third number of decoded packets exceeds the second number of source packets. In some aspects, the feedback indicates whether additional encoded packets are needed to recover at least a portion of the second number of source packets.

The apparatus 1702 may further include means for determining that the second number of source packets is recoverable when the third number of decoded packets exceeds the second number of source packets. The means for generating the feedback may be configured to generate a positive acknowledgment message indicating that no encoded packets are missing for recovering the second number of source packets when the third number of decoded packets exceeds the second number of source packets.

The apparatus 1702 may further include means for determining that the second number of source packets is not recoverable when the third number of decoded packets does not exceed the second number of source packets. The means for generating the feedback may be configured to generate a negative acknowledgment message indicating that a number of missing encoded packets are needed for recovering the second number of source packets when the third number of decoded packets does not exceed the second number of source packets. The apparatus 1702 may further include means for receiving an additional number of encoded packets associated with one or more PDCP PDUs that corresponds to the number of missing encoded packets based on the negative acknowledgment message.

The apparatus 1702 may further include means for receiving, from the base station, a configuration indicating a preconfigured timer. The apparatus 1702 may further include means for generating a status report based on the preconfigured timer, the status report comprising the feedback. The apparatus 1702 may further include means for transmitting, to the base station, the status report.

The apparatus 1702 may further include means for receiving, from the base station, a trigger signal indicating to the UE to generate the feedback. The apparatus 1702 may further include means for generating a status report based on the trigger signal, the status report comprising the feedback. The apparatus 1702 may further include means for transmitting, to the base station, the status report.

The apparatus 1702 may further include means for receiving the first number of encoded packets in an out-of-order sequence from a base station at the RLC layer. In some aspects, the means for sending may be configured to send the first number of encoded packets in the out-of-order sequence to the network coding layer. In some aspects, the means for sequencing may be configured to arrange the second number of source packets from the out-of-order sequence into a consecutively ordered sequence at the network coding layer based on a sequence number associated with each of the second number of source packets.

The apparatus 1702 may further include means for receiving one or more first encoded packets from a base station over a first logical channel at a first RLC layer. The apparatus 1702 may further include means for receiving one or more second encoded packets from a RSU over a second logical channel different than the first logical channel at a second RLC layer. In some aspects, the first number of encoded packets comprises the one or more first encoded packets and the one or more second encoded packets. The apparatus 1702 may further include means for receiving the one or more first encoded packets from the first RLC layer over the first logical channel at the network coding layer. The apparatus 1702 may further include means for receiving the one or more second encoded packets from the second RLC layer over the second logical channel at the network coding layer. In some aspects, the means for recovering may be configured to decode the second number of source packets from the one or more first encoded packets and the one or more second encoded packets.

The aforementioned means may be one or more of the aforementioned components of the apparatus 1702 configured to perform the functions recited by the aforementioned means. As described supra, the apparatus 1702 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

FIG. 18 is a diagram 1800 illustrating an example of a hardware implementation for an apparatus 1802. The apparatus 1802 may be a base station or other wireless device that communicates based on downlink/uplink. In some implementations, the apparatus 1802 may be a master node base station in a dual connectivity configuration. The apparatus 1802 includes a cellular baseband processor 1804 (also referred to as a modem) coupled to a RF transceiver 1824, a processor 1820 and a memory 1822. The cellular baseband processor 1804 communicates through the RF transceiver 1824 with other wireless devices, such as a UE 104. The cellular baseband processor 1804 may include a computer-readable medium/memory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The processor 1820 is responsible for general processing, including the execution of software stored on the computer-readable medium/memory 1822. The software, when executed by the processor 1820, causes the apparatus 1802 to perform the various functions described supra for any particular apparatus. The computer-readable medium/memory 1822 may also be used for storing data that is manipulated by the processor 1820 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the device 410 and may include the memory 476 and/or at least one of the TX processor 416, the RX processor 470, and the controller/processor 475. In one configuration, the apparatus 1802 may be a modem chip and include just the baseband processor 1804, and in another configuration, the apparatus 1802 may be the entire wireless device (e.g., see the device 410 of FIG. 4) and include the additional modules of the apparatus 1802.

The communication manager 1832 includes a flow control component 1840, an encoding component 1842, a configuration component 1844, a dynamic scheduling component 1846 and/or a protocol stack component 1848 configured to perform the aspects described in connection with methods in FIG. 8. The apparatus is illustrated as including components to perform the method of FIG. 8, because the wireless device may operate as a transmitting device at times and may operate as a receiving device at other times. In other examples, the apparatus 1802 may include components for the method of FIG. 8.

The apparatus 1802 may include additional components that perform each of the blocks of the algorithm in the aforementioned flowcharts of FIGS. 13 and/or 14. As such, each block in the aforementioned flowcharts of FIGS. 13 and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for receiving a first number of source packets from a PDCP layer. The apparatus 1802 may further include means for encoding the first number of source packets into a second number of encoded packets with a rateless network code at a first network coding layer. The apparatus 1802 may further include means for sending the second number of encoded packets from the first network coding layer to a first RLC layer. The apparatus 1802 may further include means for transmitting, to a user equipment, encoded data comprising the second number of encoded packets.

In another configuration, the apparatus 1802 includes means for determining, at a radio resource control layer, a pre-configured threshold that corresponds to a total size of encoded packets to the base station. The apparatus 1802 also may include means for determining whether the second number of encoded packets satisfies the pre-configured threshold. In some aspects, the means for sending may be configured to send a first portion of the second number of encoded packets to the first RLC layer at the base station and a second portion of the second number of encoded packets to a second RLC layer at a RSU over a RAN interface when the second number of encoded packets satisfies the pre-configured threshold, and to send the second number of encoded packets exclusively to the first RLC layer when the second number of encoded packets does not satisfy the pre-configured threshold.

The apparatus 1802 may further include means for determining whether the second number of encoded packets exceeds the preconfigured threshold that is based on a limited number of encoded packets for the base station and a size of each encoded packet in the limited number of encoded packets. The apparatus 1802 may further include means for dividing the second number of encoded packets into the first portion and the second portion when the second number of encoded packets exceeds the preconfigured threshold. In some aspects, the first portion corresponds to the limited number of encoded packets and the second portion corresponds to a difference between the second number of encoded packets and the limited number of encoded packets. In some aspects, the second portion of the second number of encoded packets is sent to the second RLC layer over the RAN interface by the first network coding layer. In some aspects, the first network coding layer is a sub-layer of the PDCP layer at the base station.

In some aspects, the second portion of the second number of encoded packets is sent to a second network coding layer of the second RLC layer over the RAN interface by the PDCP layer. In some aspects, the first network coding layer is a sub-layer of the first RLC layer at the base station and the second network coding layer is a sub-layer of the second RLC layer at the RSU.

In some aspects, the second portion of the second number of encoded packets is sent to the second RLC layer over the RAN interface by the first network coding layer. In some aspects, the first network coding layer is separate from the first RLC layer and the PDCP layer at the base station.

In some aspects, the second portion of the second number of encoded packets is sent to the second RLC layer via a second network coding layer over the RAN interface by the PDCP layer. In some aspects, the first network coding layer is separate from the first RLC layer and the PDCP layer at the base station and the second network coding layer is separate from the second RLC layer at the RSU.

The apparatus 1802 may further include means for dividing the second number of encoded packets into a first group of encoded packets associated with the base station and a second group of encoded packets associated with a RSU based on a total size of encoded packets for each of the first group and the second group or a total number of encoded packets for each of the first group and the second group. In some aspects, the means for sending is configured to send the first group of encoded packets associated with the base station to the first RLC layer at the base station and the second group of encoded packets to a second RLC layer at the RSU over a RAN interface. In some aspects, the first network coding layer is a sub-layer of the PDCP layer at the base station.

The apparatus 1802 may further include means for sending an indication request from the PDCP layer to the first RLC layer at the base station and the second RLC layer at the RSU over the RAN interface. In some aspects, the indication request indicates a request for the first RLC layer and the second RLC layer to send feedback indicating a filtered data rate or an average rate ratio of their respective paths.

The apparatus 1802 may further include means for configuring a periodic timer at the PDCP layer. The apparatus 1802 may further include means for sending a configuration indicating the periodic timer to the first RLC layer at the base station and the second RLC layer at the RSU over the RAN interface. In some aspects, the configuration triggers the first RLC layer and the second RLC layer to automatically send feedback indicating a filtered data rate or average rate ratio of their respective paths based on the periodic timer.

In another configuration, the apparatus 1802 includes means for receiving a first number of source packets at a PDCP layer. The apparatus 1802 may further include means for sending the first number of source packets from the PDCP layer to a first network coding layer of the base station. The apparatus 1802 may further include means for encoding the first number of source packets into a second number of encoded packets with a rateless network code at the first network coding layer.

The apparatus 1802 may further include means for determining whether the first number of source packets exceeds a preconfigured threshold that is based on a limited number of source packets for the base station and a size of each source packet in the limited number of source packets. In some aspects, the means for sending may be configured to send a first portion of the first number of source packets to the first network coding layer at the base station and a second portion of the first number of source packets to a second network coding layer at a RSU over a RAN interface when the first number of source packets exceeds the preconfigured threshold. The apparatus 1802 may further include means for sending the first number of source packets exclusively to the first network coding layer when the first number of source packets does not exceed the preconfigured threshold. The apparatus 1802 may further include means for dividing the first number of source packets into the first portion and the second portion when the first number of source packets exceeds the preconfigured threshold. In some aspects, the first portion corresponds to the limited number of source packets and the second portion corresponds to a difference between the first number of source packets and the limited number of source packets. In some aspects, the second portion of the first number of source packets is sent to the second network coding layer over the RAN interface by the PDCP layer. In some aspects, the first network coding layer is a sub-layer of a first RLC layer at the base station and the second network coding layer is a sub-layer of a second RLC layer at the RSU.

The apparatus 1802 may further include means for sending the first number of source packets with a duplicate number of source packets to each of the first network coding layer at the base station and a second network coding layer at a RSU over a RAN interface. In some aspects, the first number of source packets that is sent to the second network coding layer is sent over the RAN interface by the PDCP layer. In some aspects, the first network coding layer is a sub-layer of a first RLC layer at the base station and the second network coding layer is a sub-layer of a second RLC layer at the RSU. In other aspects, the second number of encoded packets at the base station is non-overlapping with a number of encoded packets associated with the first number of source packets at the RSU based on the first number of source packets having been sent with the duplicate number of source packets to each of the first network coding layer and the second network coding layer.

The apparatus 1802 may further include means for dividing the first number of source packets into a first group of source packets associated with the base station and a second group of source packets associated with a RSU based on a total size of source packets for each of the first group and the second group or a total number of source packets for each of the first group and the second group. In some aspects, the means for sending may be configured to send the first group of source packets associated with the base station to the first network coding layer at the base station and the second group of source packets to a second network coding layer at the RSU over a RAN interface. In some aspects, the first network coding layer is a sub-layer of a first RLC layer at the base station and the second network coding layer is a sub-layer of a second RLC layer at the RSU.

The aforementioned means may be one or more of the aforementioned components of the apparatus 1802 configured to perform the functions recited by the aforementioned means. As described supra, the apparatus 1802 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

Figure 19:
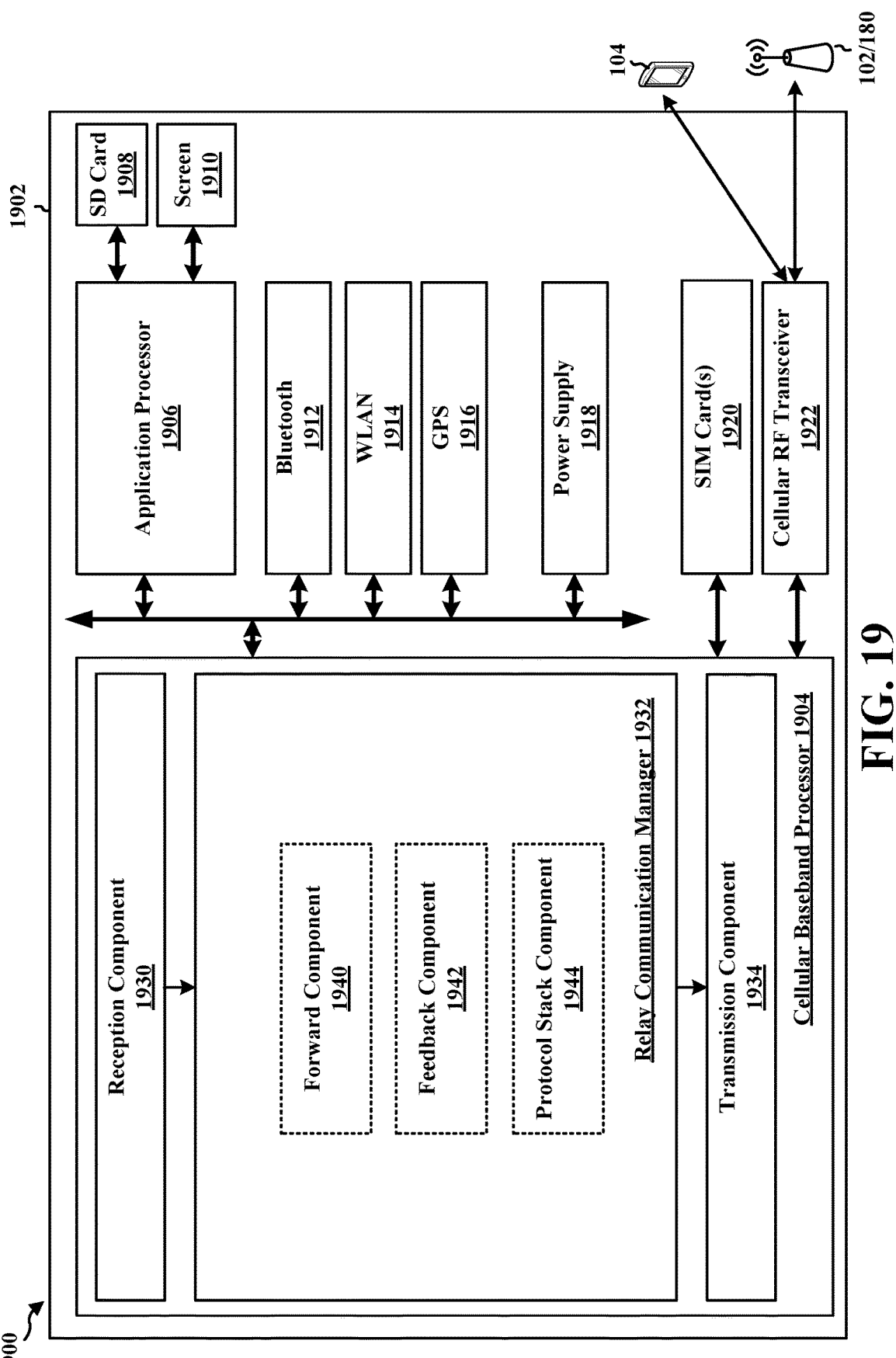
FIG. 19 is a diagram illustrating an example of a hardware implementation for an example apparatus.

FIG. 19 is a diagram 1900 illustrating an example of a hardware implementation for an apparatus 1902. The apparatus 1902 may be a RSU or other wireless device that communicates based on backhaul link and/or sidelink. In some implementations, the apparatus 1902 may be a secondary node base station in a dual connectivity configuration. The apparatus 1902 includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with other wireless devices, such as a UE 104 and/or base station 102/180. The cellular baseband processor 1904 may include a computer-readable medium/memory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a relay communication manager 1932, and a transmission component 1934. The relay communication manager 1932 includes the one or more illustrated components. The components within the relay communication manager 1932 may be stored in the computer-readable medium/memory and/or configured as hardware within the cellular baseband processor 1904. The cellular baseband processor 1904 may be a component of the device 450 and may include the memory 460 and/or at least one of the TX processor 468, the RX processor 456, and the controller/processor 459. In one configuration, the apparatus 1902 may be a modem chip and include just the baseband processor 1904, and in another configuration, the apparatus 1902 may be the entire wireless device (e.g., see the device 450 of FIG. 4) and include the additional modules of the apparatus 1902.

The relay communication manager 1932 includes a forward component 1940, a feedback component 1942 and/or a protocol stack component 1944 configured to perform the aspects described in connection with the process in FIG. 15. The apparatus is illustrated as including components to perform the process in FIG. 15, because the RSU may operate as a transmitting device at times and may operate as a receiving device at other times.

The apparatus 1902 may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for receiving, at a RLC layer of the RSU, a first group of encoded packets from a network coding layer. The apparatus 1902 also may include means for transmitting, to a user equipment, the first group of encoded packets, the first group of encoded packets being associated with a second group of encoded packets at a base station.

The apparatus 1902 also may include means for receiving, from the network coding layer of a base station over a RAN interface, the first group of encoded packets at the RLC layer of the RSU. In some aspects, the network coding layer is a sub-layer of a PDCP layer at the base station.

The apparatus 1902 may further include means for receiving, from a PDCP layer of a base station over a RAN interface, a first group of source packets at the network coding layer of the RSU. In some aspects, the first group of source packets is associated with a second group of source packets at the base station. The apparatus 1902 may further include means for encoding the first group of source packets into the first group of encoded packets with a rateless network code at the network coding layer of the RSU. The apparatus 1902 may further include means for sending the first group of encoded packets from the network coding layer to the RLC layer.

The aforementioned means may be one or more of the aforementioned components of the apparatus 1902 configured to perform the functions recited by the aforementioned means. As described supra, the apparatus 1902 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

The following examples are illustrative only and may be combined with aspects of other embodiments or teachings described herein, without limitation.

Aspect 1 is a method of wireless communication at a base station that includes receiving a first number of source packets from a packet data convergence protocol (PDCP) layer; encoding the first number of source packets into a second number of encoded packets with a rateless network code at a first network coding layer; sending the second number of encoded packets from the first network coding layer to a first radio link control (RLC) layer; and transmitting, to a user equipment, encoded data comprising the second number of encoded packets.

In Aspect 2, the method of Aspect 1 further includes determining, at a radio resource control (RRC) layer, a pre-configured threshold that corresponds to a total size of encoded packets for the base station; determining whether the second number of encoded packets satisfies the pre-configured threshold, wherein the sending comprises sending a first portion of the second number of encoded packets to the first RLC layer at the base station and a second portion of the second number of encoded packets to a second RLC layer at a road side unit (RSU) over a radio access network (RAN) interface when the second number of encoded packets satisfies the pre-configured threshold, and sending the second number of encoded packets exclusively to the first RLC layer when the second number of encoded packets does not satisfy the pre-configured threshold.

In Aspect 3, the method of Aspect 1 or Aspect 2 further includes that the determining comprises determining whether the second number of encoded packets exceeds the preconfigured threshold that is based on a limited number of encoded packets for the base station and a size of each encoded packet in the limited number of encoded packets, further comprising dividing the second number of encoded packets into the first portion and the second portion when the second number of encoded packets exceeds the preconfigured threshold, wherein the first portion corresponds to the limited number of encoded packets and the second portion corresponds to a difference between the second number of encoded packets and the limited number of encoded packets, and wherein the second portion of the second number of encoded packets is sent to the second RLC layer over the RAN interface by the first network coding layer, wherein the first network coding layer is a sub-layer of the PDCP layer at the base station.

In Aspect 4, the method of Aspect 1 or Aspect 2 further includes that the second portion of the second number of encoded packets is sent to a second network coding layer of the second RLC layer over the RAN interface by the PDCP layer, wherein the first network coding layer is a sub-layer of the first RLC layer at the base station and the second network coding layer is a sub-layer of the second RLC layer at the RSU.

In Aspect 5, the method of Aspect 1 or Aspect 2 further includes that the second portion of the second number of encoded packets is sent to the second RLC layer over the RAN interface by the first network coding layer, wherein the first network coding layer is separate from the first RLC layer and the PDCP layer at the base station.

In Aspect 6, the method of Aspect 1 or Aspect 2 further includes that the second portion of the second number of encoded packets is sent to the second RLC layer via a second network coding layer over the RAN interface by the PDCP layer, wherein the first network coding layer is separate from the first RLC layer and the PDCP layer at the base station and the second network coding layer is separate from the second RLC layer at the RSU.

In Aspect 7, the method of any of Aspects 1-6 further includes dividing the second number of encoded packets into a first group of encoded packets associated with the base station and a second group of encoded packets associated with a road side unit (RSU) based on a total size of encoded packets for each of the first group and the second group or a total number of encoded packets for each of the first group and the second group, wherein the sending comprises sending the first group of encoded packets associated with the base station to the first RLC layer at the base station and the second group of encoded packets to a second RLC layer at the RSU over a radio access network (RAN) interface, wherein the first network coding layer is a sub-layer of the PDCP layer at the base station.

In Aspect 8, the method of any of Aspects 1-7 further includes sending an indication request from the PDCP layer to the first RLC layer at the base station and the second RLC layer at the RSU over the RAN interface, the indication request indicating a request for the first RLC layer and the second RLC layer to send feedback indicating a filtered data rate or an average rate ratio of their respective paths.

In Aspect 9, the method of any of Aspects 1-7 further includes configuring a periodic timer; and sending a configuration indicating the periodic timer to the first RLC layer at the base station and the second RLC layer at the RSU over the RAN interface, the configuration triggering the first RLC layer and the second RLC layer to automatically send feedback indicating a filtered data rate or average rate ratio of their respective paths based on the periodic timer, wherein the configuring comprises configuring the periodic timer at the PDCP layer or at the RRC layer.

Aspect 10 is a device including one or more processors and one or more memories in electronic communication with the one or more processors storing instructions executable by the one or more processors to cause a system or an apparatus to implement a method as in any of Aspects 1 to 9.

Aspect 11 is a system or apparatus including means for implementing a method or realizing an apparatus as in any of Aspects 1 to 9.

Aspect 12 is a non-transitory computer-readable medium storing instructions executable by one or more processors to cause the one or more processors to implement a method as in any of Aspects 1 to 9.

Aspect 13 is a method of wireless communication at a base station that includes receiving a first number of source packets at a packet data convergence protocol (PDCP) layer; sending the first number of source packets from the PDCP layer to a first network coding layer of the base station; and encoding the first number of source packets into a second number of encoded packets with a rateless network code at the first network coding layer.

In Aspect 14, the method of Aspect 13 further includes determining whether the first number of source packets exceeds a preconfigured threshold that is based on a limited number of source packets for the base station and a size of each source packet in the limited number of source packets, wherein the sending comprises sending a first portion of the first number of source packets to the first network coding layer at the base station and a second portion of the first number of source packets to a second network coding layer at a road side unit (RSU) over a radio access network (RAN) interface when the first number of source packets exceeds the preconfigured threshold, and sending the first number of source packets exclusively to the first network coding layer when the first number of source packets does not exceed the preconfigured threshold; and dividing the first number of source packets into the first portion and the second portion when the first number of source packets exceeds the preconfigured threshold, wherein the first portion corresponds to the limited number of source packets and the second portion corresponds to a difference between the first number of source packets and the limited number of source packets, wherein the second portion of the first number of source packets is sent to the second network coding layer over the RAN interface by the PDCP layer, wherein the first network coding layer is a sub-layer of a first radio link control (RLC) layer at the base station and the second network coding layer is a sub-layer of a second RLC layer at the RSU.

In Aspect 15, the method of Aspect 13 further includes that the sending comprises sending the first number of source packets with a duplicate number of source packets to each of the first network coding layer at the base station and a second network coding layer at a road side unit (RSU) over a radio access network (RAN) interface, the first number of source packets that is sent to the second network coding layer is sent over the RAN interface by the PDCP layer, the first network coding layer is a sub-layer of a first radio link control (RLC) layer at the base station and the second network coding layer is a sub-layer of a second RLC layer at the RSU, and the second number of encoded packets at the base station is non-overlapping with a number of encoded packets associated with the first number of source packets at the RSU based on the first number of source packets having been sent with the duplicate number of source packets to each of the first network coding layer and the second network coding layer.

In Aspect 16, the method of Aspect 13 further includes dividing the first number of source packets into a first group of source packets associated with the base station and a second group of source packets associated with a road side unit (RSU) based on a total size of source packets for each of the first group and the second group or a total number of source packets for each of the first group and the second group, wherein the sending comprises sending the first group of source packets associated with the base station to the first network coding layer at the base station and the second group of source packets to a second network coding layer at the RSU over a radio access network (RAN) interface, wherein the first network coding layer is a sublayer of a first radio link control (RLC) layer at the base station and the second network coding layer is a sub-layer of a second RLC layer at the RSU.

Aspect 17 is a device including one or more processors and one or more memories in electronic communication with the one or more processors storing instructions executable by the one or more processors to cause a system or an apparatus to implement a method as in any of Aspects 13 to 16.

Aspect 18 is a system or apparatus including means for implementing a method or realizing an apparatus as in any of Aspects 13 to 16.

Aspect 19 is a non-transitory computer-readable medium storing instructions executable by one or more processors to cause the one or more processors to implement a method as in any of Aspects 13 to 16.

Aspect 20 is a method of wireless communication at a road side unit (RSU) that includes receiving, at a radio link control (RLC) layer of the RSU, a first group of encoded packets from a network coding layer; and transmitting, to a user equipment, the first group of encoded packets, the first group of encoded packets being associated with a second group of encoded packets at a base station.

In Aspect 21, the method of Aspect 20 further includes receiving, from the network coding layer of a base station over a radio access network (RAN) interface, the first group of encoded packets at the RLC layer of the RSU, wherein the network coding layer is a sub-layer of a packet data convergence protocol (PDCP) layer at the base station.

In Aspect 22, the method of Aspect 20 further includes receiving, from a packet data convergence protocol (PDCP) layer of a base station over a radio access network (RAN) interface, a first group of source packets at the network coding layer of the RSU, the first group of source packets being associated with a second group of source packets at the base station; encoding the first group of source packets into the first group of encoded packets with a rateless network code at the network coding layer of the RSU; and sending the first group of encoded packets from the network coding layer to the RLC layer.

In Aspect 23, the method of Aspect 22 further includes that the network coding layer is a sub-layer of the RLC layer at the RSU.

In Aspect 24, the method of Aspect 22 further includes that the network coding layer is separate from the RLC layer.

Aspect 25 is a device including one or more processors and one or more memories in electronic communication with the one or more processors storing instructions executable by the one or more processors to cause a system or an apparatus to implement a method as in any of Aspects 20 to 23.

Aspect 26 is a system or apparatus including means for implementing a method or realizing an apparatus as in any of Aspects 20 to 23.

Aspect 27 is a non-transitory computer-readable medium storing instructions executable by one or more processors to cause the one or more processors to implement a method as in any of Aspects 20 to 23.

Aspect 28 is a method of wireless communication at a user equipment (UE) that includes sending a first number of encoded packets from a radio link control (RLC) layer to a network coding layer; recovering a second number of source packets from the first number of encoded packets with a rateless network code at the network coding layer, the first number of encoded packets having a greater number of packets than the second number of source packets; sequencing the second number of source packets into an ordered set of source packets at the network coding layer; and sending the ordered set of source packets from the network coding layer to a packet data convergence protocol (PDCP) layer.

In Aspect 29, the method of Aspect 28 further includes that the recovering comprises decoding the first number of encoded packets into a third number of decoded packets; determining whether the third number of decoded packets exceeds the second number of source packets; generating feedback at the network coding layer based on the determining of whether the third number of decoded packets exceeds the second number of source packets, the feedback indicating whether additional encoded packets are needed to recover at least a portion of the second number of source packets; and transmitting, to a base station, the feedback.

In Aspect 30, the method of Aspect 28 or Aspect 29 further includes determining that the second number of source packets is recoverable when the third number of decoded packets exceeds the second number of source packets, wherein the generating the feedback comprises generating a positive acknowledgment message indicating that no encoded packets are missing for recovering the second number of source packets when the second number of source packets is recoverable.

In Aspect 31, the method of any of Aspects 28-30 further includes determining that the second number of source packets is not recoverable when the third number of decoded packets does not exceed the second number of source packets, wherein the generating the feedback comprises generating a negative acknowledgment message indicating that a number of missing encoded packets are needed for recovering the second number of source packets when the second number of source packets is not recoverable; and receiving an additional number of encoded packets associated with one or more PDCP packet data units (PDUs) that corresponds to the number of missing encoded packets based on the negative acknowledgment message.

In Aspect 32, the method of any of Aspects 28-31 further includes receiving, from the base station, a configuration indicating a preconfigured timer; generating a status report based on the preconfigured timer, the status report comprising the feedback; and transmitting, to the base station, the status report.

In Aspect 33, the method of any of Aspects 28-31 further includes receiving, from the base station, a trigger signal indicating to the UE to generate the feedback; generating a status report based on the trigger signal, the status report comprising the feedback; and transmitting, to the base station, the status report.

In Aspect 34, the method of any of Aspects 28-33 further includes receiving the first number of encoded packets in an out-of-order sequence from a base station at the RLC layer, wherein the sending the first number of encoded packets comprises sending the first number of encoded packets in the out-of-order sequence to the network coding layer, the sequencing comprises arranging the second number of source packets from the out-of-order sequence into a consecutively ordered sequence at the network coding layer based on a sequence number associated with each of the second number of source packets.

In Aspect 35, the method of any of Aspects 28-34 further includes receiving one or more first encoded packets from a base station over a first logical channel at a first RLC layer; receiving one or more second encoded packets from a road side unit (RSU) over a second logical channel different than the first logical channel at a second RLC layer, wherein the first number of encoded packets comprises the one or more first encoded packets and the one or more second encoded packets; receiving the one or more first encoded packets from the first RLC layer over the first logical channel at the network coding layer, and receiving the one or more second encoded packets from the second RLC layer over the second logical channel at the network coding layer, wherein the recovering comprises decoding the second number of source packets from the one or more first encoded packets and the one or more second encoded packets.

In Aspect 36, the method of any of Aspects 28-35 further includes that the recovering and the sequencing are performed at the RLC layer via the network coding layer, wherein the network coding layer is a sublayer of the RLC layer.

In Aspect 37, the method of any of Aspects 28-36 further includes that the recovering and the sequencing are performed at the PDCP layer via the network coding layer, wherein the network coding layer is a sublayer of the PDCP layer.

In Aspect 38, the method of any of Aspects 28-37 further includes that the network coding layer is separate from the RLC layer and the PDCP layer.

In Aspect 39, the method of any of Aspects 28-38 further includes that the UE has dual connectivity with the base station and the RSU, wherein the base station corresponds to a master base station associated with a first radio access technology (RAT) and the RSU corresponds to a secondary base station associated with a second RAT, wherein each of the first RAT and the second RAT corresponds to one of a Fifth Generation (5G) New Radio (NR) access technology or a Fourth Generation (4G) Long-Term Evolution (LTE) access technology.

Aspect 40 is a device including one or more processors and one or more memories in electronic communication with the one or more processors storing instructions executable by the one or more processors to cause a system or an apparatus to implement a method as in any of Aspects 28 to 39.

Aspect 44 is a system or apparatus including means for implementing a method or realizing an apparatus as in any of Aspects 28 to 39.

Aspect 45 is a non-transitory computer-readable medium storing instructions executable by one or more processors to cause the one or more processors to implement a method as in any of Aspects 28 to 39.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, the method comprising:
   receiving a first number of source packets from a packet data convergence protocol (PDCP) layer;
   determining, at a radio resource control (RRC) layer, a pre-configured threshold that corresponds to a total size of encoded packets for the base station;
   encoding the first number of source packets into a second number of encoded packets with a rateless network code at a first network coding layer;
   determining whether the second number of encoded packets satisfies the pre-configured threshold;
   sending the second number of encoded packets from the first network coding layer to a first radio link control (RLC) layer, wherein the sending comprises:
      sending a first portion of the second number of encoded packets to the first RLC layer at the base station and a second portion of the second number of encoded packets to a second RLC layer at a road side unit (RSU) over a radio access network (RAN) interface when the second number of encoded packets satisfies the pre-configured threshold, and
      sending the second number of encoded packets exclusively to the first RLC layer when the second number of encoded packets does not satisfy the pre-configured threshold; and
   transmitting, to a user equipment, encoded data comprising the second number of encoded packets.

2. The method of claim 1, wherein the determining comprises determining whether the second number of encoded packets exceeds the pre-configured threshold that is based on a limited number of encoded packets for the base station and a size of each encoded packet in the limited number of encoded packets,
   further comprising dividing the second number of encoded packets into the first portion and the second portion when the second number of encoded packets exceeds the pre-configured threshold, wherein the first portion corresponds to the limited number of encoded packets and the second portion corresponds to a difference between the second number of encoded packets and the limited number of encoded packets, wherein the second portion of the second number of encoded packets is sent to the second RLC layer over the RAN interface by the first network coding layer, wherein the first network coding layer is a sub-layer of the PDCP layer at the base station.

3. The method of claim 1, wherein the second portion of the second number of encoded packets is sent to a second network coding layer of the second RLC layer over the RAN interface by the PDCP layer, wherein the first network coding layer is a sub-layer of the first RLC layer at the base station and the second network coding layer is a sub-layer of the second RLC layer at the RSU.

4. The method of claim 1, wherein the second portion of the second number of encoded packets is sent to the second RLC layer over the RAN interface by the first network coding layer, wherein the first network coding layer is separate from the first RLC layer and the PDCP layer at the base station.

5. The method of claim 1, wherein the second portion of the second number of encoded packets is sent to the second RLC layer via a second network coding layer over the RAN interface by the PDCP layer, wherein the first network coding layer is separate from the first RLC layer and the PDCP layer at the base station and the second network coding layer is separate from the second RLC layer at the RSU.

6. The method of claim 1, further comprising:

dividing the second number of encoded packets into a first group of encoded packets associated with the base station and a second group of encoded packets associated with the RSU based on a total size of encoded packets for each of the first group and the second group or a total number of encoded packets for each of the first group and the second group, and wherein the sending comprises:

sending the first group of encoded packets associated with the base station to the first RLC layer at the base station and the second group of encoded packets to a second RLC layer at the RSU over the RAN interface, wherein the first network coding layer is a sub-layer of the PDCP layer at the base station.

7. The method of claim 1, further comprising:

sending an indication request from the PDCP layer to the first RLC layer at the base station and the second RLC layer at the RSU over the RAN interface, the indication request indicating a request for the first RLC layer and the second RLC layer to send feedback indicating a filtered data rate or an average rate ratio of their respective paths.

8. The method of claim 1, further comprising:

configuring a periodic timer; and sending a configuration indicating the periodic timer to the first RLC layer at the base station and the second RLC layer at the RSU over the RAN interface, the configuration triggering the first RLC layer and the second RLC layer to automatically send feedback indicating a filtered data rate or average rate ratio of their respective paths based on the periodic timer, wherein the configuring comprises configuring the periodic timer at the PDCP layer or at the RRC layer.

9. A method of wireless communication at a base station, the method comprising:

receiving a first number of source packets at a packet data convergence protocol (PDCP) layer;

sending the first number of source packets from the PDCP layer to a first network coding layer of the base station;

encoding the first number of source packets into a second number of encoded packets with a rateless network code at the first network coding layer;

determining whether the first number of source packets exceeds a preconfigured threshold that is based on a limited number of source packets for the base station and a size of each source packet in the limited number of source packets;

dividing the first number of source packets into a first portion and a second portion when the first number of source packets exceeds the preconfigured threshold, wherein the first portion corresponds to the limited number of source packets and the second portion corresponds to a difference between the first number of source packets and the limited number of source packets, wherein the second portion of the first number of source packets is sent to a second network coding layer over a radio access network (RAN) interface by the PDCP layer, wherein the first network coding layer is a sub-layer of a first radio link control (RLC) layer at the base station and the second network coding layer is a sub-layer of a second RLC layer at a road side unit (RSU);

sending a first portion of the first number of source packets to the first network coding layer at the base station and a second portion of the first number of source packets to a second network coding layer at the RSU over the RAN interface when the first number of source packets exceeds the preconfigured threshold; and sending the first number of source packets exclusively to the first network coding layer when the first number of source packets does not exceed the preconfigured threshold.

10. The method of claim 9, wherein:

the sending comprises sending the first number of source packets with a duplicate number of source packets to each of the first network coding layer at the base station and a second network coding layer at the RSU over the RAN interface, the first number of source packets that is sent to the second network coding layer is sent over the RAN interface by the PDCP layer, the first network coding layer is a sub-layer of a first radio link control (RLC) layer at the base station and the second network coding layer is a sub-layer of a second RLC layer at the RSU, and the second number of encoded packets at the base station is non-overlapping with a number of encoded packets associated with the first number of source packets at the RSU based on the first number of source packets having been sent with the duplicate number of source packets to each of the first network coding layer and the second network coding layer.

11. The method of claim 9, further comprising:

dividing the first number of source packets into a first group of source packets associated with the base station and a second group of source packets associated with the RSU based on a total size of source packets for each of the first group and the second group or a total number of source packets for each of the first group and the second group, and wherein the sending comprises sending the first group of source packets associated with the base station to the first network coding layer at the base station and the second group of source packets to a second network coding layer at the RSU over the RAN interface, wherein the first network coding layer is a sub-layer of a the first RLC layer at the base station and the second network coding layer is a sub-layer of a second RLC layer at the RSU.

12. An apparatus for wireless communication, the apparatus comprising:

a memory; and at least one processor coupled to the memory and configured to:

receive a first number of source packets from a packet data convergence protocol PDCP) layer;

determine, at a radio resource control (RRC) layer, a pre-configured threshold that corresponds to a total size of encoded packets for the apparatus;

encode the first number of source packets into a second number of encoded packets with a rateless network code at a first network coding layer;

determine whether the second number of encoded packets satisfies the pre-configured threshold;

send the second number of encoded packets from the first network coding layer to a first radio link control (RLC) layer, wherein the sending comprises:

sending a first portion of the second number of encoded packets to the first RLC layer at the apparatus and a second portion of the second number of encoded packets to a second RLC layer at a road side unit (RSU) over a radio access network (RAN) interface when the second number of encoded packets satisfies the pre-configured threshold, and sending the second number of encoded packets exclusively to the first RLC layer when the second number of encoded packets does not satisfy the pre-configured threshold; and transmit, to a user equipment, encoded data comprising the second number of encoded packets.

13. An apparatus of claim 12, wherein the determining comprises determining whether the second number of encoded packets exceeds the pre-configured threshold that is based on a limited number of encoded packets for the apparatus and a size of each encoded packet in the limited number of encoded packets, wherein the at least one processor is further configured to:

divide the second number of encoded packets into the first portion and the second portion when the second number of encoded packets exceeds the pre-configured threshold, wherein the first portion corresponds to the limited number of encoded packets and the second portion corresponds to a difference between the second number of encoded packets and the limited number of encoded packets, wherein the second portion of the second number of encoded packets is sent to the second RLC layer over the RAN interface by the first network coding layer, wherein the first network coding layer is a sub-layer of the PDCP layer at the apparatus.

14. The apparatus of claim 12, wherein the second portion of the second number of encoded packets is sent to a second network coding layer of the second RLC layer over the RAN interface by the PDCP layer, wherein the first network coding layer is a sub-layer of the first RLC layer at the apparatus and the second network coding layer is a sub-layer of the second RLC layer at the RSU.

15. The apparatus of claim 12, wherein the second portion of the second number of encoded packets is sent to the second RLC layer over the RAN interface by the first network coding layer, wherein the first network coding layer is separate from the first RLC layer and the PDCP layer at the apparatus.

16. The apparatus of claim 12, wherein the second portion of the second number of encoded packets is sent to the second RLC layer via a second network coding layer over the RAN interface by the PDCP layer, wherein the first network coding layer is separate from the first RLC layer and the PDCP layer at the apparatus and the second network coding layer is separate from the second RLC layer at the RSU.

17. The apparatus of claim 12, wherein the at least one processor is further configured to:

divide the second number of encoded packets into a first group of encoded packets associated with the apparatus and a second group of encoded packets associated with the RSU based on a total size of encoded packets for each of the first group and the second group or a total number of encoded packets for each of the first group and the second group, and wherein the sending comprises:

sending the first group of encoded packets associated with the apparatus to the first RLC layer at the apparatus and the second group of encoded packets to a second RLC layer at the RSU over the RAN interface, wherein the first network coding layer is a sub-layer of the PDCP layer at the apparatus.

18. The apparatus of claim 12, wherein the at least one processor is further configured to:

send an indication request from the PDCP layer to the first RLC layer at the apparatus and the second RLC layer at the RSU over the RAN interface, the indication request indicating a request for the first RLC layer and the second RLC layer to send feedback indicating a filtered data rate or an average rate ratio of their respective paths.

19. The apparatus of claim 12, wherein the at least one processor is further configured to:

configure a periodic timer; and send a configuration indicating the periodic timer to the first RLC layer at the apparatus and the second RLC layer at the RSU over the RAN interface, the configuration triggering the first RLC layer and the second RLC layer to automatically send feedback indicating a filtered data rate or average rate ratio of their respective paths based on the periodic timer, wherein the configuring comprises configuring the periodic timer at the PDCP layer or at the RRC layer.

20. An apparatus for wireless communication, the apparatus comprising:

a memory; and at least one processor coupled to the memory and configured to:

receive a first number of source packets at a packet data convergence protocol (PDCP) layer;

send the first number of source packets from the PDCP layer to a first network coding layer of the apparatus;

encode the first number of source packets into a second number of encoded packets with a rateless network code at the first network coding layer;

determine whether the first number of source packets exceeds a preconfigured threshold that is based on a limited number of source packets for the apparatus and a size of each source packet in the limited number of source packets;

divide the first number of source packets into a first portion and a second portion when the first number of source packets exceeds the preconfigured threshold, wherein the first portion corresponds to the limited number of source packets and the second portion corresponds to a difference between the first number of source packets and the limited number of source packets, wherein the second portion of the first number of source packets is sent to a second network coding layer over a radio access network (RAN) interface by the PDCP layer, wherein the first network coding layer is a sub-layer of a first radio link control (RLC) layer at the apparatus and the second network coding layer is a sub-layer of a second RLC layer at a road side unit (RSU);

send a first portion of the first number of source packets to the first network coding layer at the apparatus and a second portion of the first number of source packets to a second network coding layer at the RSU over the RAN interface when the first number of source packets exceeds the preconfigured threshold; and send the first number of source packets exclusively to the first network coding layer when the first number of source packets does not exceed the preconfigured threshold.

21. The apparatus of claim 20, wherein:

the sending comprises sending the first number of source packets with a duplicate number of source packets to each of the first network coding layer at the apparatus and a second network coding layer at the RSU over a the RAN interface, the first number of source packets that is sent to the second network coding layer is sent over the RAN interface by the PDCP layer, the first network coding layer is a sub-layer of the first RLC layer at the apparatus and the second network coding layer is a sub-layer of a second RLC layer at the RSU, and the second number of encoded packets at the apparatus is non-overlapping with a number of encoded packets associated with the first number of source packets at the RSU based on the first number of source packets having been sent with the duplicate number of source packets to each of the first network coding layer and the second network coding layer.

22. The apparatus of claim 20, wherein the at least one processor is further configured to:

divide the first number of source packets into a first group of source packets associated with the apparatus and a second group of source packets associated with the RSU based on a total size of source packets for each of the first group and the second group or a total number of source packets for each of the first group and the second group, and wherein the sending comprises sending the first group of source packets associated with the apparatus to the first network coding layer at the apparatus and the second group of source packets to a second network coding layer at the RSU over the RAN interface, wherein the first network coding layer is a sub-layer of the first RLC layer at the apparatus and the second network coding layer is a sub-layer of a second RLC layer at the RSU.

* * * * *